(12) United States Patent
Biagioni et al.

(10) Patent No.: US 7,522,574 B2
(45) Date of Patent: Apr. 21, 2009

(54) POWER EFFICIENT COMMUNICATION SYSTEM

(75) Inventors: Andrea R. Biagioni, Melrose, MA (US); Alan M. Cohen, Newton, MA (US); Jeffrey R. Thumm, Norfolk, MA (US)

(73) Assignee: Omni Medics Corporation, Melrose, MA (US)

( * ) Notice: Subject to any disclaimer, the term of this patent is extended or adjusted under 35 U.S.C. 154(b) by 19 days.

(21) Appl. No.: 11/800,135

(22) Filed: May 4, 2007

(65) Prior Publication Data

US 2007/0263563 A1 Nov. 15, 2007

Related U.S. Application Data

(60) Provisional application No. 60/842,787, filed on Sep. 7, 2006, provisional application No. 60/800,356, filed on May 15, 2006.

(51) Int. Cl.
*H04Q 7/00* (2006.01)

(52) U.S. Cl. .................. 370/338; 370/310; 370/311; 370/318; 370/335; 455/502; 455/550.1; 455/574; 600/300

(58) Field of Classification Search .......... 600/300, 600/301, 310, 444, 473–474; 455/41.2–41.3, 455/500–502, 432.1, 524, 550.1, 67.11, 67.13, 455/456.1–457, 552.1, 574, 522, 69; 370/310, 370/328, 338, 311, 318; 340/539.1–539.24, 340/545

See application file for complete search history.

(56) References Cited

U.S. PATENT DOCUMENTS

| | | | | |
|---|---|---|---|---|
| 3,943,918 A | 3/1976 | Lewis | ......................... | 600/392 |
| 4,121,573 A | 10/1978 | Crovella et al. | ......... | 128/2.1 A |
| 5,228,449 A | 7/1993 | Christ et al. | ................ | 600/504 |
| 5,307,818 A | 5/1994 | Segalowitz | .................. | 600/509 |
| 5,503,158 A | 4/1996 | Coppock et al. | ............ | 128/696 |
| 5,634,468 A | 6/1997 | Platt et al. | .................... | 128/696 |
| 5,704,351 A | 1/1998 | Mortara et al. | .............. | 600/382 |
| 5,818,385 A * | 10/1998 | Bartholomew | .............. | 342/372 |
| 5,862,803 A | 1/1999 | Besson et al. | ................ | 600/508 |
| 5,957,854 A | 9/1999 | Besson et al. | ................ | 600/509 |
| 6,161,036 A | 12/2000 | Matsumura et al. | ......... | 600/509 |
| 6,167,258 A | 12/2000 | Schmidt | ..................... | 455/419 |

(Continued)

OTHER PUBLICATIONS

Internet pages of Philips Electronics entitled "IntelliVue Telemetry System", 3 pages printed Feb. 25, 2007.

(Continued)

*Primary Examiner*—Kamran Afshar
(74) *Attorney, Agent, or Firm*—Joyce E. Lauer

(57) ABSTRACT

A monitoring system comprises a specific remote unit or monitor and a plurality of base stations that are capable of communicating with one another. A designated one of the plurality of base stations transmits a message via a wireless medium to the specific remote unit on behalf of the plurality of base stations, and the plurality of base stations use a shared base station identifier or shared sender address for communication with the specific remote unit or monitor. In another aspect, a first designated one transmits a message during a first time period and a second designated one transmits a message during a second time period. Receiving messages from a designated one of the plurality of base stations using the shared base station identifier helps the specific remote unit or monitor to reduce its power usage.

32 Claims, 18 Drawing Sheets

U.S. PATENT DOCUMENTS

| | | | |
|---|---|---|---|
| 6,238,338 B1 | 5/2001 | DeLuca et al. | 600/300 |
| 6,385,473 B1 | 5/2002 | Haines et al. | 600/393 |
| 6,389,309 B1 | 5/2002 | Matsumura et al. | 600/509 |
| 6,416,471 B1 | 7/2002 | Kumar et al. | 600/300 |
| 6,434,420 B1 | 8/2002 | Taheri | 600/547 |
| 6,441,747 B1 | 8/2002 | Khair et al. | 340/870.16 |
| 6,454,708 B1 * | 9/2002 | Ferguson et al. | 600/300 |
| 6,740,033 B1 | 5/2004 | Olejniczak et al. | 600/301 |
| 6,987,965 B2 | 1/2006 | Ng et al. | 455/419 |
| 7,053,831 B2 * | 5/2006 | Dempsey et al. | 342/463 |
| 7,171,166 B2 * | 1/2007 | Ng et al. | 455/73 |
| 2003/0176798 A1 | 9/2003 | Simon | 600/509 |
| 2003/0191402 A1 | 10/2003 | Arzbaecher et al. | 600/509 |
| 2003/0191808 A1 * | 10/2003 | Adler et al. | 709/207 |
| 2003/0212311 A1 | 11/2003 | Nova et al. | 600/300 |
| 2004/0068195 A1 | 4/2004 | Massicotte et al. | 600/509 |
| 2004/0068196 A1 | 4/2004 | Massicotte et al. | 600/509 |
| 2004/0102683 A1 * | 5/2004 | Khanuja et al. | 600/300 |
| 2005/0065445 A1 | 3/2005 | Arzbaecher et al. | 600/515 |
| 2005/0113703 A1 | 5/2005 | Farringdon et al. | 600/509 |
| 2005/0148887 A1 | 7/2005 | Reiter et al. | 600/508 |
| 2005/0154323 A1 | 7/2005 | Vogtmeier et al. | 600/509 |
| 2005/0154325 A1 | 7/2005 | Lauter et al. | 600/515 |
| 2006/0030781 A1 | 2/2006 | Shennib | 600/509 |
| 2006/0100530 A1 | 5/2006 | Kliot et al. | 600/483 |
| 2006/0111643 A1 | 5/2006 | Cazares et al. | 600/518 |
| 2006/0121846 A1 | 6/2006 | Mazar et al. | 455/7 |

OTHER PUBLICATIONS

Internet pages entitled "Handover and Handoff", 2 pages printed Apr. 21, 2007.

Internet pages entitled "802.11 Beacons Revealed", 3 pages written by Jim Geier and dated Oct. 31, 2002, printed Apr. 21, 2007.

* cited by examiner

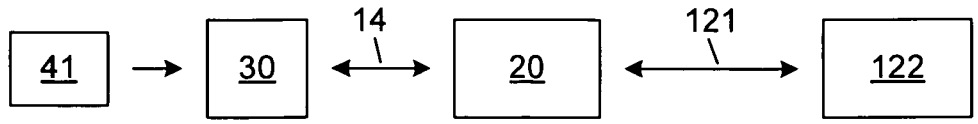
FIG. 1  PRIOR ART
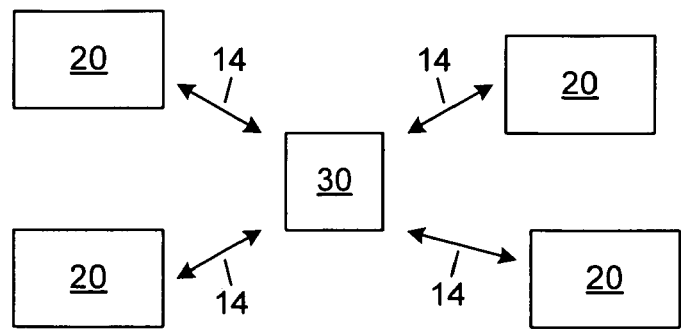
FIG. 2  PRIOR ART
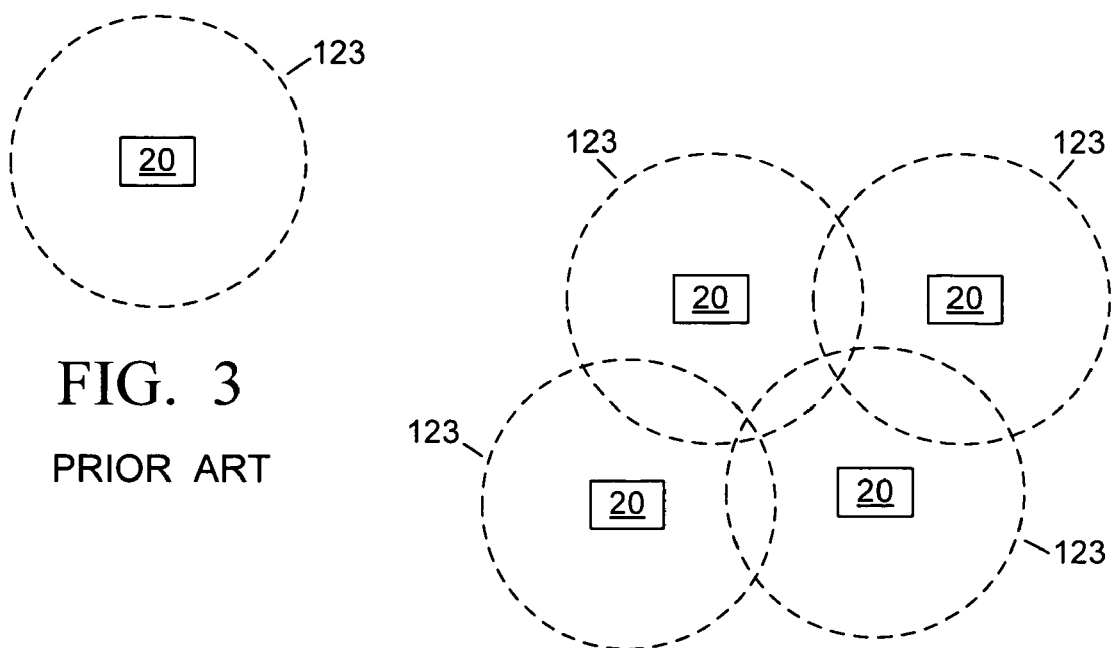
FIG. 3  PRIOR ART
FIG. 4  PRIOR ART

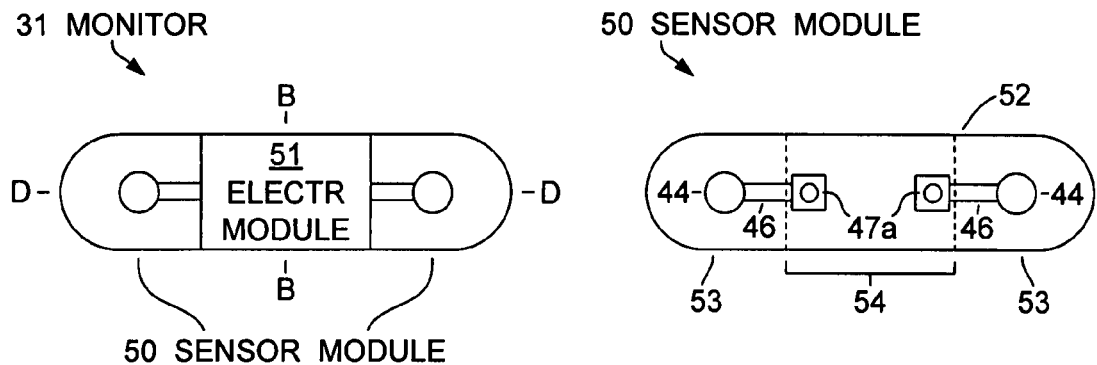
FIG. 15  FIG. 17
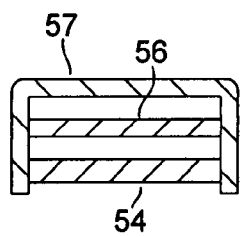 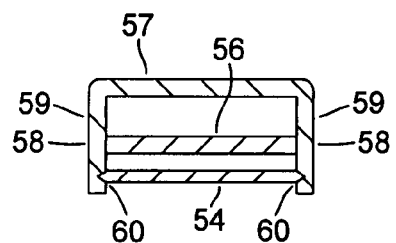
FIG. 16  FIG. 19
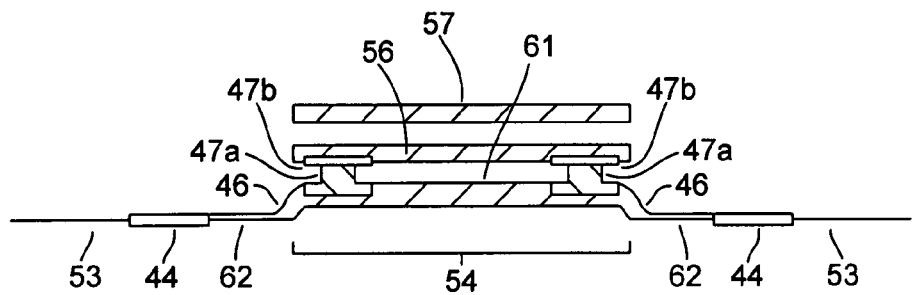
FIG. 18

POWER EFFICIENT COMMUNICATION SYSTEM

CROSS-REFERENCE TO RELATED APPLICATIONS

The present application claims the benefit under 35 U.S.C. § 119 of Provisional Application Ser. No. 60/800,356, filed May 15, 2006 and of Provisional Application Ser. No. 60/842,787, filed Sep. 7, 2006. The above-referenced applications are incorporated by reference herein.

BACKGROUND

Embodiments described herein relate to wireless monitoring. Wireless monitoring is useful in many situations. For example, wireless monitoring may be used in health care to monitor physiological values for a patient, and to call attention to changes in physiological values that may indicate a condition requiring attention. By using wireless monitoring instead of conventional wired instrumentation, patients are free to move around within, for example, a home or physician's office or hospital, rather than being tethered within a small area by electrical cables.

Wireless monitoring may also be used, for example, to monitor the location of a person who might be endangered by straying, such as a child or an elderly person whose memory is impaired. Wireless monitoring may also be used, for example, to monitor conditions or processes or equipment in settings where wired monitoring is inconvenient or difficult. In a chemical plant, for example, it may be convenient to attach wireless monitors to pipes or vessels or other equipment rather than using wired monitors that require electrical cables or cords.

FIG. 1 is a block diagram of a typical wireless monitoring system. A remote unit 30 may be affixed to a patient for use in a health care setting. Data 41 indicating one or more physiological values are collected by remote unit 30 and transmitted via a wireless medium 14 to a base station 20. The physiological values monitored may include, for example, values for blood pressure or oxygen saturation or heart electrical activity (electrocardiogram). The base station 20 may also send data to the remote unit 30, such as acknowledgement of successful reception of data, request for battery status, and so forth. The data 41 received from the remote unit 30 are available at the base station 20 for observation or storage or for retransmission over a connection 121, as appropriate. For example, data 41 may be transmitted to a data processing device 122. Remote unit 30 typically is powered by a storage battery, while base station 20 typically is powered from the alternating current (AC) mains. Wireless communication may be acoustic, optical, or radio, radio normally being preferred as it does not typically require an unobstructed line of sight between sender and receiver.

The utility of a wireless monitoring system is dependent on several attributes of the system, including:
(1) Size (dimensions) of the remote unit 30: smaller is usually better;
(2) Weight of the remote unit 30: lighter is usually better;
(3) Range over which the remote unit 30 may roam while maintaining wireless contact with the base station 20: greater range is better; and
(4) Battery lifetime (operational time of the remote unit 30 before the battery discharges): longer is better.

These attributes are interdependent, and optimizing one attribute often has a negative effect on another. For example, a simple way to increase range is to increase the transmission strength of the wireless signal. Transmitting a stronger signal, however, requires more electrical current per unit time, which can only be achieved by decreasing battery lifetime and/or by increasing battery capacity (thereby increasing the size and weight of remote unit 30). Conversely, decreasing the size and weight of the remote unit 30 by using a smaller battery will normally decrease available power, and thus negatively impact the range and/or battery life of the remote unit 30.

The trade-off between battery size and weight versus wireless range and battery lifetime is particularly important because the battery typically is the largest and heaviest component of a contemporary remote unit 30. Thus, a change in battery size and weight will normally have an important effect on the size and weight of remote unit 30. Minimizing the power requirements of remote unit 30 can help to reduce the size and weight of remote unit 30. Small size and weight may be especially advantageous in certain monitoring systems, such as a health care monitoring system where remote unit 30 is mounted upon a patient.

In many instances, it may be desirable for the remote unit 30 to communicate wirelessly with a plurality of base stations 20. For example, it may be useful to transmit data 41 to several locations simultaneously. In a health care monitoring system, for example, it may be advantageous to transmit physiological values for a patient to several nursing stations, each having a base station 20. Also, the availability of multiple base stations 20 can increase the area over which a patient may roam while still maintaining contact with at least one base station 20. FIG. 2 is a block diagram of a wireless monitoring system that includes a remote unit 30 and four base stations 20. Each base station 20 communicates with remote unit 30 via a wireless medium 14.

FIG. 3 depicts the zone of coverage 123 for a single base station 20. The actual size and shape of the zone of coverage 123 depends upon many factors, including the power of the transmission, the sensitivity of the receiver, the type of antenna, and interfering surfaces and objects. FIG. 4 depicts the zone of coverage 123 afforded by a plurality of base stations 20. The zone of coverage 123 provided by multiple base stations 20, which is depicted in FIG. 4, is much larger than the zone of coverage 123 for a single base station 20, which is depicted in FIG. 3.

Increasing the number of base stations 20 in communication with a remote unit 30 poses several complications, however. One complication is the potential need to ensure that all base stations 20 receive data 41 transmitted by the remote unit 30, even if not all base stations 20 are currently in contact with the remote unit 30. Another complication is the need to coordinate transmissions from individual base stations 20 to the remote unit 30. If several base stations 20 attempt to communicate with the remote unit 30 at the same time, then the signals may "collide", rendering all communications unreadable by the remote unit 30.

Coordination of tranmissions from individual base stations 20 may be achieved using any of various techniques, such as randomizing the transmission times for individual base stations 20 so that the transmissions times are unlikely to overlap, or by assigning unique transmission time slots to each base station 20. These techniques work well in systems that have plenty of available power, such as systems that are powered from AC mains power, yet have a subtle but important drawback in battery-powered devices, as is explained below.

In order for a message to be transmitted successfully, the transmitter must transmit and the receiver must receive. It is often not appreciated that in low-power systems a transceiver's receiver circuitry typically requires as much or more power to operate as does its transmission circuitry. Power used for message reception becomes particularly important in the case of a remote unit 30 that communicates with plural base stations 20. Remote unit 30 must receive various messages from the plural base stations 20, such as messages that acknowledge successful transmission of data 41, or messages that includes commands, or messages that request information about battery status. Typically, remote unit 30 must power its receiver circuitry to receive these messages from each of plural base stations 20.

Minimizing the power consumption of a device's transmission circuitry can be accomplished by powering the transmitter only when the device needs to send data. Minimizing the power consumption of a device's receiver circuitry is less straightforward: the device must predict the times when another device might be transmitting to it, and power the receiver circuitry during those times only.

Modern communication systems typically use data bursting technology. Rather than sending a continuous stream of data, these systems send bursts of data (known as packets), either periodically or as needed. In practice, low-power transceivers use algorithms to coordinate sending and receiving times of each transmission (burst). Time slots are agreed upon for transmission and reception to take place. FIG. 5 illustrates a hypothetical time course of transmission (T), reception (R), and power usage (P) for a low-power device such as a remote unit 30 that communicates with a single base station 20. The transmission circuitry is turned on during a first time slot and the receiver circuitry is turned on during a second time slot. Power is used during both the first time slot and the second time slot.

When a remote unit 30 needs to receive transmissions from a plurality of base stations 20, it must turn on its receiver circuitry for a long enough time to receive from each of the base stations 20 without collisions. This, however, significantly increases power consumption. FIG. 6 illustrates a hypothetical time course of transmission (T), reception (R), and power usage (P) for a low-power device such as a remote unit 30 that communicates with four base stations 20. The transmission circuitry is turned on during a first time slot and the receiver circuitry is turned on during four subsequent time slots. Power is used during five time slots, resulting in much greater power consumption than in the example of FIG. 5.

In wireless monitoring systems such as the system illustrated in FIG. 1, typically the remote unit 30 is a low-power or ultra-low-power device while considerable power is available to the base station 20. The remote unit 30 typically expends at least half (often up to 90%) of its power budget in data communication (transmission and reception). In addition to communicating with the remote unit 30, the base station 20 typically communicates with other entities using a network connection or other communication means.

Communication between the base station 20 and another entity may entail, for example, transferring data 41 to a second base station 20 or to another device that is part of a network of devices that includes base station 20. Base station 20, or another device in the network that includes base station 20, may also transfer data 41 to one or more distant entities, where distant entities are understood to be entities outside of the network. For example, data 41 may be transferred via a telephone or internet connection to a distant device such as the data processing device 122 depicted in FIG. 1. An alert about a condition that may require attention is another type of message that may be communicated to a distant entity. For example, an alert may be communicated using an audible signal, such as that produced by a bell or buzzer, in order to notify a human responder (a distant entity) to investigate the condition. An alert may also be communicated, for example, via a telephone or internet connection. Communication with distant entities typically is performed by devices such as a base station 20, and not by remote unit 30 itself, because remote unit 30 is a low-power device that may not be able to communicate with distant entities. While the term "base station" is used herein, it is understood that other terms such as "Access Point" may be used to describe a device that performs the function of communicating with distant entities; the term "Access Point" is used in the 802.11 communication protocol.

For a low-power remote unit 30 where it is desirable to minimize power consumption, the base station 20 should appear to be dedicated to the remote unit 30, when viewed from the perspective of the remote unit 30. This apparent dedication of the base station 20 prevents the remote unit 30 from wasting power due to the base station 20 not being ready at a given time. While the base station 20 may in fact communicate with other entities, as described previously, the base station 20 should appear to be dedicated to the remote unit 30.

In the simplest case, there is a single remote unit 30 at a fixed location and a single base station 20 at a fixed location; in other words, the system is a 2-element point-to-point network. Such as system requires either a dedicated communications channel or some initial handshaking to set up the connection parameters, but after that it can be quite predictable and reliable. Real-life examples are older cordless phones (that use a dedicated channel) and wireless devices that use handshaking to set up parameters, such as wireless devices that use the BLUETOOTH communication protocol.

In medical monitoring applications, it is common for the remote unit 30 to be mobile; for example, it may be attached to a human being. Mobility of the remote unit 30 raises several issues. One issue is that the remote unit 30 may come into and go out of range of an individual base station 20. Another issue is "handing over" the connection across multiple base stations 20 to avoid dropping the connection. In a system that includes a network with multiple base stations 20, it is extremely likely that individual base stations 20 will become unreachable and then reachable again, and will not come on-line at the same time. This set of issues related to mobility of the remote unit 30 and plurality of the base stations 20 requires a sophisticated algorithm to adapt the network to the changing conditions.

Dealing with the complexity described above can become very burdensome for an ultra-low-power device such as a remote unit 30, especially if the device needs to reliably transmit data at the same time. It may be desirable, therefore, to shift this complexity away from the remote unit 30. In a system with multiple base stations 20, each of which needs to receive data from the remote unit 30, one approach to avoiding complexity is to have the remote unit 30 transmit the same data to all base stations 20, and to have each base station 20 individually acknowledge receipt of the data. While this approach avoids some complexity, it increases the power consumption by the remote unit 30, as illustrated in FIG. 6.

There is a need for a communication system that enables a wireless remote unit 30 to communicate with multiple base stations 20 while consuming minimal power, as in the hypothetical time course of transmission (T), reception (R), and power usage (P) that is illustrated in FIG. 7.

SUMMARY

A monitoring system comprises a specific remote unit or monitor and a plurality of base stations that are capable of communicating with one another. A designated one of the plurality of base stations transmits a message via a wireless medium to the specific remote unit on behalf of the plurality of base stations, and the plurality of base stations use a shared base station identifier or shared sender address for communication with the specific remote unit or monitor. In another aspect, a first designated one transmits a message during a first time period and a second designated one transmits a message during a second time period. Receiving messages from a designated one of the plurality of base stations using the shared base station identifier helps the specific remote unit or monitor to reduce its power usage.

Additional embodiments are described in the detailed description below. This summary does not purport to define the invention. The invention is defined by the claims.

BRIEF DESCRIPTION OF THE DRAWINGS

FIG. 1 is a block diagram of a typical wireless monitoring system.

FIG. 2 is a block diagram of a wireless monitoring system that includes a remote unit and four base stations.

FIG. 3 depicts the zone of coverage of a single base station.

FIG. 4 depicts the zone of coverage afforded by a plurality of base stations.

FIG. 15 depicts the monitor in the system of FIG. 13, the monitor comprising an electronics module and a sensor module, in accordance with an embodiment.

FIG. 16 is a cross-sectional view of the monitor of FIG. 15, with the plane of section taken along line BB of FIG. 15, in accordance with an embodiment.

FIG. 17 depicts the sensor module in the monitor of FIG. 15, in accordance with an embodiment.

FIG. 18 is a longitudinal-section view of the monitor of FIG. 15, with the plane of section taken along line DD of FIG. 15, in accordance with an embodiment.

FIG. 19 is a cross-sectional view of the monitor of FIG. 15, with the plane of section taken along line BB of FIG. 15, in accordance with an embodiment.

DETAILED DESCRIPTION

Reference will now be made in detail to some embodiments, examples of which are illustrated in the accompanying drawings. In this description and in the appended claims, the terms 'a' or 'an' are used, as is common in patent documents, to include one or more than one. In this description and in the appended claims, the term 'or' is used to refer to a nonexclusive or, unless otherwise indicated.

Figure 8:
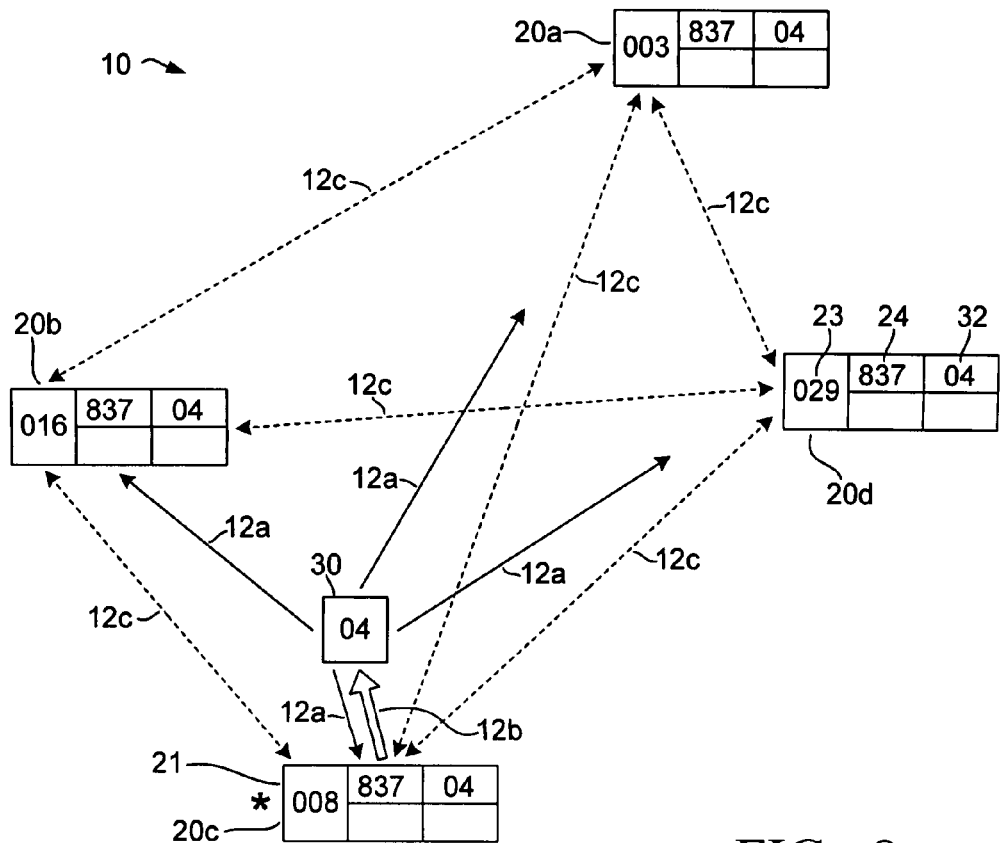
FIG. 8 depicts a communication system that includes a remote unit and plural base stations, in accordance with an embodiment.

FIG. 8 depicts a communication system 10 that includes a remote unit 30 and plural base stations 20a-d, in accordance with an embodiment. The plural base stations 20a-d are capable of communicating with one another by sending messages 12c. The communication between base stations 20a-d may occur either via wired connections or via a wireless medium. Base stations 20*a-d* and remote unit 30 are capable of communicating with one another via a wireless medium. The communication between base stations 20*a-d*, and the communication between remote unit 30 and base stations 20*a-d*, may employ a non-standard communication protocol or a standard communication protocol or more than one protocol may be employed. For example, a non-standard communication protocol such as that described in connection with FIGS. 28-32 may be employed, together with one or more standard communication protocols such as TCP/IP or 802.11.

Remote unit 30 may be a mobile device but need not be mobile. For example, remote unit 30 may be a mobile device associated with an animal such as a human. In another example, remote unit 30 may be attached to a stationary pipe or vessel. Base stations 20 may be mobile but need not be mobile. For example, a base station 20 may be associated with an animal such as a human, or base stations 20 may be mounted on vehicles. In this description and in the appended claims, the terms 'remote unit' and 'monitor' are used as synonyms; the terms have the same meaning.

As used in this description and in the appended claims, the terms "base station" and "remote unit" are defined to mean one or more base stations 20 that communicate with a specific remote unit 30 in a monitoring system where the monitoring system is defined based on two criteria: (1) electric power; and (2) communication with distant entities. These two criteria are described further below. A monitoring system typically will satisfy both criterion (1) and criterion (2). In some embodiments, however, a monitoring system might satisfy only criterion (1) or only criterion (2).

The power source for a remote unit 30 is a limited stored energy source. Typically the limited stored energy source is a battery, although it might also be, for example, a charged capacitor or a flywheel. The power source for a base station 20 might be alternating current (AC) mains power or a generator or a battery. Criterion (1) states that the power available to the base station 20, measured in watts, is greater than the power available to the remote unit 30.

Criterion (2) concerns means for communicating with one or more distant entity, where a distant entity is understood to mean an entity that is outside of the group or network of base stations 20 that communicate with the remote unit 30. Criterion (2) states that the base station 20, or another non-base-station communication device within the group or network that includes one or more base stations 20, employs means for communicating with distant entities that is more powerful than any means for communicating with distant entities that is used by the remote unit 30. Typically the remote unit 30 will have no means for communicating with distant entities. In some embodiments, however, the remote unit 30 may have low-power means, such as a colored light or blinking light, for communicating with distant entities, while the Base Station 20 or other communication device in the group or network has more powerful means for communicating with distant entities. In one example of less powerful and more powerful communication means, the remote unit 30 may have a colored light that alerts a viewer to a dangerous condition whereas a base station 20 may send a message by telephone or emit a loud sound to alert an emergency responder to a dangerous condition. The term "more powerful" means that a communication means uses more power, measured in watts, compared to the power used by another communication means.

Various means may serve as means for communicating with distant entities. For example, a device might communicate with distant entities using a visual signal such as a light of a specific color, or a combination of lights, or a blinking light, or a visual image or text displayed on a screen. In another example, a device might use a sound such as a bell or buzzer or sound recording or synthetic voice to communicate with distant entities. In another example, a device might use a telephone connection combined with voice synthesis or digital data, or an internet connection combined with digital data, for communication with distant entities. Distant entities that may receive the communication from the group or network include, for example, a human who hears a buzzer or a communication device that receives digital data.

Each base station 20*a-d* has an identity which may correspond to, for example, a physical hardware device or a portion of a hardware device or a time slice of function in a base station 20 whose function is time-sliced or a spectral band channel in a base station 20 having multiple channels that use separate spectral (frequency) bands. In the embodiment depicted, the identity for each base station 20 is associated with an individual base station identifier 23. For clarity, reference number 23 is indicated for base station 20*d* only. In the embodiment of FIG. 8, base stations 20*a*, 20*b*, 20*c*, and 20*d* are associated with individual base station identifier values "003", "016", "008", and "029", respectively.

Base stations 20*a-d* are associated in a group or network for communication via a wireless medium with a specific remote unit 30. This association is not exclusive, as base stations 20*a-d* may also communicate with other specific remote units 30, as described below in connection with FIG. 11. The establishment of the communication between a specific remote unit 30 and a group of base stations 20 is described below in connection with FIG. 29. The specific remote unit 30 that is in communication with base stations 20*a-d* may have a remote unit identifier. In the embodiment of FIG. 8, the remote unit identifier for the specific remote unit 30 has the value "04". Base stations 20*a-d* may store the remote unit identifier, as indicated by reference number 32 in FIG. 8. For clarity, reference number 32 is indicated for base station 20*d* only.

Specific remote unit 30 transmits via the wireless medium a message 12*a* that is intended for base stations 20*a-d*. Some of the base stations 20*a-d* may be within range and receive the message 12*a*, whereas others may be out of range. Specific remote unit 30 may be a mobile device whose location may change with time. At the time depicted in FIG. 8, base stations 20*b* and 20*c* are within range of specific remote unit 30 and can receive message 12*a*, whereas base stations 20*a* and 20*d* are out of range of specific remote unit 30.

For communication with a specific remote unit 30, base stations 20*a-d* use a shared base station identifier 24. In the embodiment of FIG. 8, shared base station identifier 24 has the value "837". For clarity, reference number 24 is indicated for base station 20*d* only. When specific remote unit 30 transmits message 12*a* that is intended for base stations 20*a-d*, message 12*a* includes shared base station identifier 24 having the value "837". When any of base stations 20*a-d* receives a message 12*a* containing a shared base station identifier 24 having the value "837", the base station 20 knows that it should accept the message 12*a* for further processing.

For any time period, only a single designated one 21 of base stations 20*a-d* transmits a message 12*b* to specific remote unit 30. For any time period, a base station 20 does not transmit any message 12*b* unless that base station 20 is the designated one 21. The identity of the designated one 21 may change with time, as described below in connection with FIGS. 10A and 10B. At the time depicted in FIG. 8, base station 20*c* is the designated one 21. If more than one base station 20 receives a message 12*a* from specific remote unit 30, only the designated one 21 is allowed to transmit an acknowledgement message to specific remote unit 30. Individual base stations 20 that receive message 12*a* do not transmit individual acknowledgement messages to specific remote unit 30. If an acknowledgement message is to be transmitted, the designated one 21 transmits the acknowledgement message on behalf of the base stations 20a-d. The designated one 21 may transmit other types of messages 12b that are not acknowledgement messages to the specific remote unit 30 on behalf of base stations 20a-d.

When transmitting a message 12b to the specific remote unit 30 that has remote unit identifier 32 with value "04", the designated one 21 includes the shared base station identifier 24 having the value "837". When specific remote unit 30 receives a message 12b containing a shared base station identifier 24 having the value "837", specific remote unit 30 knows that it should accept the message 12b for further processing. Shared base station identifier 24 serves as a "shared sender address" that is used by whichever base station 20 is the current designated one 21.

Specific remote unit 30 does not know that shared base station identifier 24 represents more than one base station 20. From the perspective of specific remote unit 30, there appears to be only a single base station 20. At the time depicted in FIG. 8, base station 20c is the designated one 21. Any base station 20 that wishes to communicate with specific remote unit 30 must transmit a message 12c, either directly or indirectly, to the designated one 21, and the designated one 21 then transmits a message 12b to specific remote unit 30 on behalf of the group of base stations 20a-d.

Shared base station identifier 24 may be viewed as a "group identifier" or "Group ID" that is used in for communication between specific remote unit 30 and the group or network of base stations 20a-d that are associated for communication with specific remote unit 30. One or more other communication devices that are not base stations 20 may also be associated with a group or network that uses a shared base station identifier 24 or "Group ID".

Figure 5:
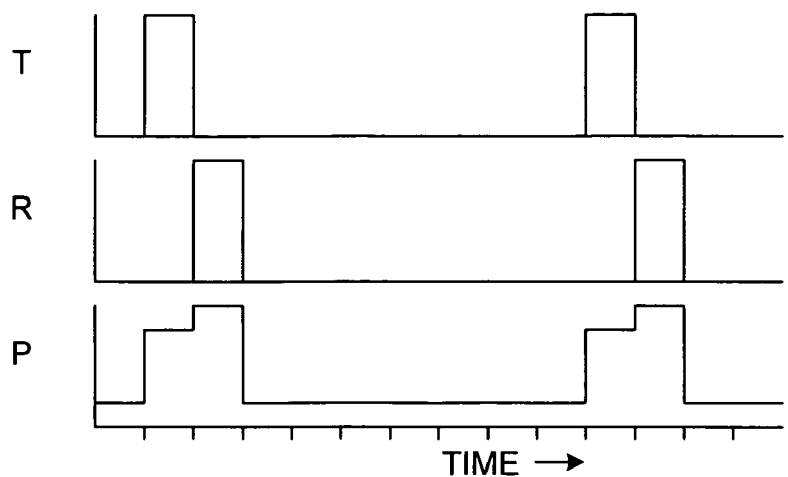
FIG. 5 illustrates a hypothetical time course of transmission (T), reception (R), and power usage (P) for a low-power device such as a remote unit that communicates with a single base station.
Figure 6:
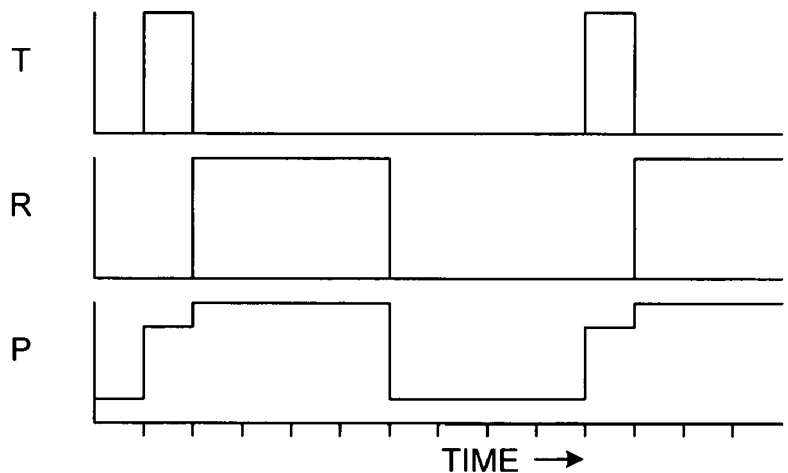
FIG. 6 illustrates a hypothetical time course of transmission (T), reception (R), and power usage (P) for a low-power device such as a remote unit 30 that communicates with four base stations 20.
Figure 7:
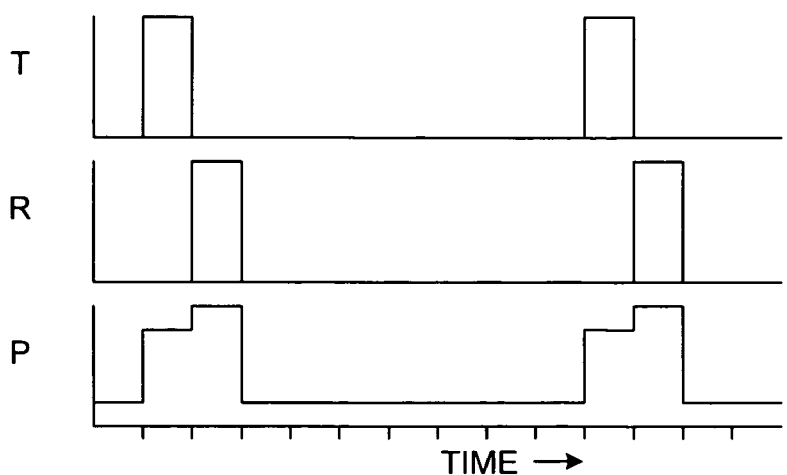
FIG. 7 illustrates a hypothetical time course of transmission (T), reception (R), and power usage (P) for a low-power device such as a remote unit 30 in communication with four base stations 20, in accordance with an embodiment.

FIG. 7 illustrates a hypothetical time course of transmission (T), reception (R), and power usage (P) for a remote unit 30 in communication with four base stations 20, in accordance with an embodiment. Remote unit 30 receives messages from a designated one of a plurality of base stations 20 on behalf of the plurality of base stations 20. For remote unit 30, the transmission circuitry is turned on during a first time slot and the receiver circuitry is turned on during a second time slot, irrespective of the number of base stations 20. Power is used during two time slots, resulting in much less power consumption than in the example of FIG. 6.

Figure 9:
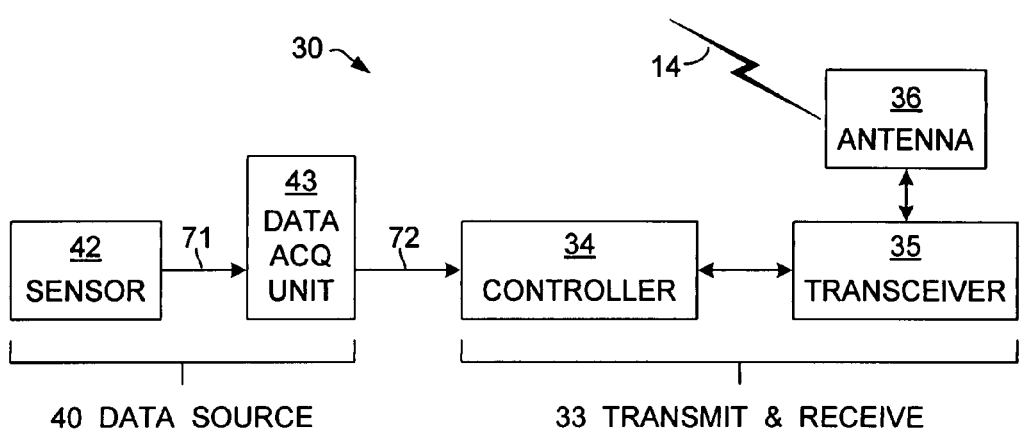
FIG. 9 is a block diagram of the remote unit in the system of FIG. 1_prov.

FIG. 9 is a block diagram of the remote unit 30 in the system 10 of FIG. 8. Remote unit 30 comprises a data source 40 and means for transmitting and receiving 33. In the embodiment of FIG. 9, the means for transmitting and receiving 33 comprises a controller 34, a transceiver 35, and an antenna 36 for communication over a wireless medium 14. The data source 40 sends 72 data to the means for transmitting and receiving 33. In another embodiment, means for transmitting and receiving 33 may additionally send information or requests or other messages to data source 40. In the embodiment of FIG. 9, the data source 40 comprises a data acquisition unit 43 and a sensor 42 that sends 71 a signal to the data acquisition unit 43. Remote unit 30 may include an analog-to-digital converter. Controller 34 may perform various functions such as analysis of data. In another embodiment, transceiver 35 may be replaced by a separate transmitter and receiver. Circuitry and operation of remote unit 30 are described further below in connection with FIG. 20.

Message 12a transmitted by specific remote unit 30 may include information that is based upon data that is sent from data source 40 to means for transmitting and receiving 33. Data that is sent from data source 40 to means for transmitting and receiving 33 may be data that is newly acquired using sensor 42 or the data may be data that was stored within data acquisition unit 43. The information transmitted in message 12a may also be derived from information that was stored within controller 34 or within an additional memory (not shown). The information transmitted in message 12a may, for example, indicate the battery status for a battery that supplies power to remote unit 30. In another embodiment, the system 10 of FIG. 8 may be used in a medical setting or for some other type of remote monitoring or telemetry application. In such an embodiment, the message 12a transmitted by specific remote unit 30 may contain information pertaining to, for example, a physiological value or a detection of a substance or a condition. In a telemetry application for an industrial process, the message 12a transmitted by specific remote unit 30 may contain information pertaining to detection of, for example, temperature or pH or flow rate or chemical composition. Monitoring embodiments are described further in connection with FIGS. 13-22.

Figure 10A:
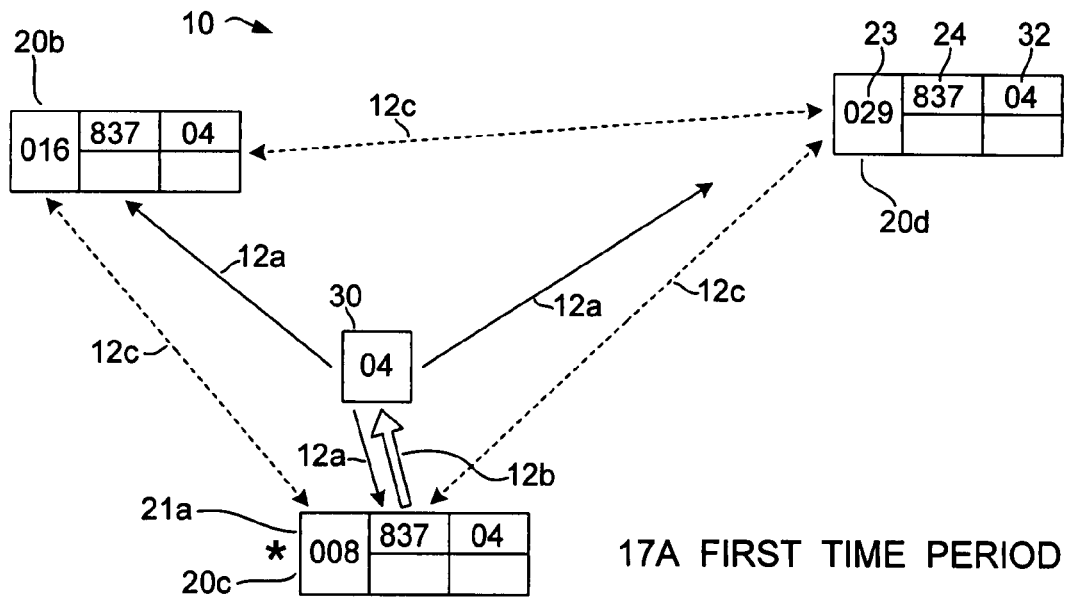
FIG. 10A depicts a communication system with dynamic designation of the designated base station, during a first time period.
Figure 10B:
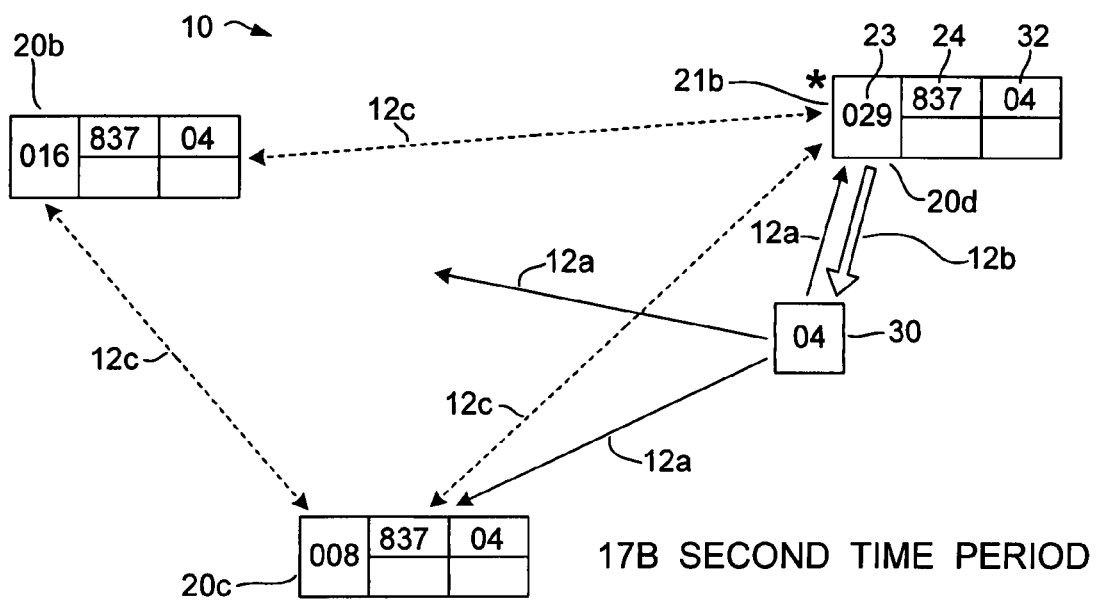
FIG. 10B depicts a communication system with dynamic designation of the designated base station, during a second time period.

FIGS. 10A and 10B depict a communication system 10 with dynamic designation of the designated base station 20. Dynamic designation means that the designated one 21 that transmits to the specific remote unit 30 may change over time. Dynamic designation may improve the reliability of the communication system 10. As noted above, specific remote unit 30 may be a mobile device whose location may change with time. Specific remote unit 30 may be used in a setting, such as a medical system, in which reliable transmission is important, even when the location of the specific remote unit 30 changes. Reliable transmission means that at least one of the base stations 20 is within range of specific remote unit 30 most of the time, with time gaps of no more than a specified duration when all base stations 20 are out of range. The degree of reliability required in individual settings may vary. For example, in a system that monitors heart activity of a human being in order to detect a dangerous condition, a maximum permissible gap duration might be about one minute.

In the system 10 of FIGS. 10A and 10B, a first designated one 21a of the plural base stations 20b-d transmits a message 12b to a specific remote unit 30 during a first time period 17A (FIG. 10A) and a second designated one 21b of the plural base stations 20b-d transmits a message 12b to the specific remote unit 30 during a second time period 17B (FIG. 10B), in accordance with an embodiment. The embodiment of FIGS. 10A and 10B is similar to that of FIG. 8 except that the designated one 21 differs for the first time period 17A and the second time period 17B. During the first time period 17A, base station 20c is the designated one 21a. During the second time period 17B, base station 20d is the designated one 21b. When a message 12b is transmitted, either by the first designated one 21a or by the second designated one 21b, message 12b includes the shared base station identifier 24 having the value "837". Shared base station identifier 24 serves as a "shared sender address" that is used by whichever base station 20 is the current designated one 21. For clarity, reference number 24 is indicated for base station 20d only.

At a given time, some of the base stations 20b-d may be within range and receive the message 12a transmitted by specific remote unit 30, whereas others may be out of range. During the first time period 17A, base stations 20b and 20c are within range of specific remote unit 30 and can receive message 12a, whereas base station 20d is out of range of specific remote unit 30. Furthermore, specific remote unit 30 is located nearer to base station 20c than to base station 20b. Because of its proximity to specific remote unit 30, base station 20c may have the strongest signal for transmitting to and receiving from specific base station 30. It thus may be advantageous to designate base station 20c as the designated one 21a during the first time period 17A.

During the second time period 17B, specific remote unit 30 has moved to a new location and is now out of range of base station 20b. Specific remote unit 30 is still within range of base station 20c, but specific remote unit 30 is now located nearest to base station 20d. Because of its proximity to specific remote unit 30, base station 20d may have the strongest signal for transmitting to and receiving from specific base station 30. It thus may be advantageous to designate base station 20d as the designated one 21b during the second time period 17B.

In one embodiment, designation of the designated one 21 is at least partially based upon the signal-to-noise ratio for the message 12a that is received by at least one of the base stations 20. For example, in the system 10 depicted in FIG. 10A, base station 20c transmits a message 12b during the first time period 17A. Following the transmission by base station 20c, specific remote unit 30 moves near to base station 20d. Then, as depicted in FIG. 10B, during the second time period 17B, specific remote unit 30 transmits a message 12a. The signal-to-noise ratio for message 12a received at base station 20d may be higher than the signal-to-noise ratio for message 12a received at base station 20c. Base station 20d may then be designated as the new designated one 21b, with the designation being at least partially based upon the signal-to-noise ratio for the various base stations 20b-d.

Designation of the designated one 21 may occur in various ways in various embodiments. Designation of the designated one 21 may occur periodically, either at a scheduled time or in response to a message 12a transmitted by specific remote unit 30 or in response to a message 12c transmitted between base stations 20. The identity for the designated one 21 may differ from one time period to another time period, but it need not differ; the identity for the designated one 21 may be unchanged during several time periods. The designation may be carried out by one of the base stations 20 or by another device that is not a base station but that is part of the group or network of devices, including base stations 20, that are capable of communicating with one another. In one embodiment based on the signal-to-noise ratio, each base station 20 that received message 12a transmits a message 12c to a master device, which may be a base station 20. The message 12c includes the signal-to-noise ratio for the received message 12a and may also include information pertaining to the received message 12a. The master device chooses one of the base stations 20 to be the new designated one 21, with the designation being at least partially based upon the signal-to-noise ratio. In a simpler embodiment, the designation may be effected by flipping of a hardware switch by a human finger.

Figure 11:
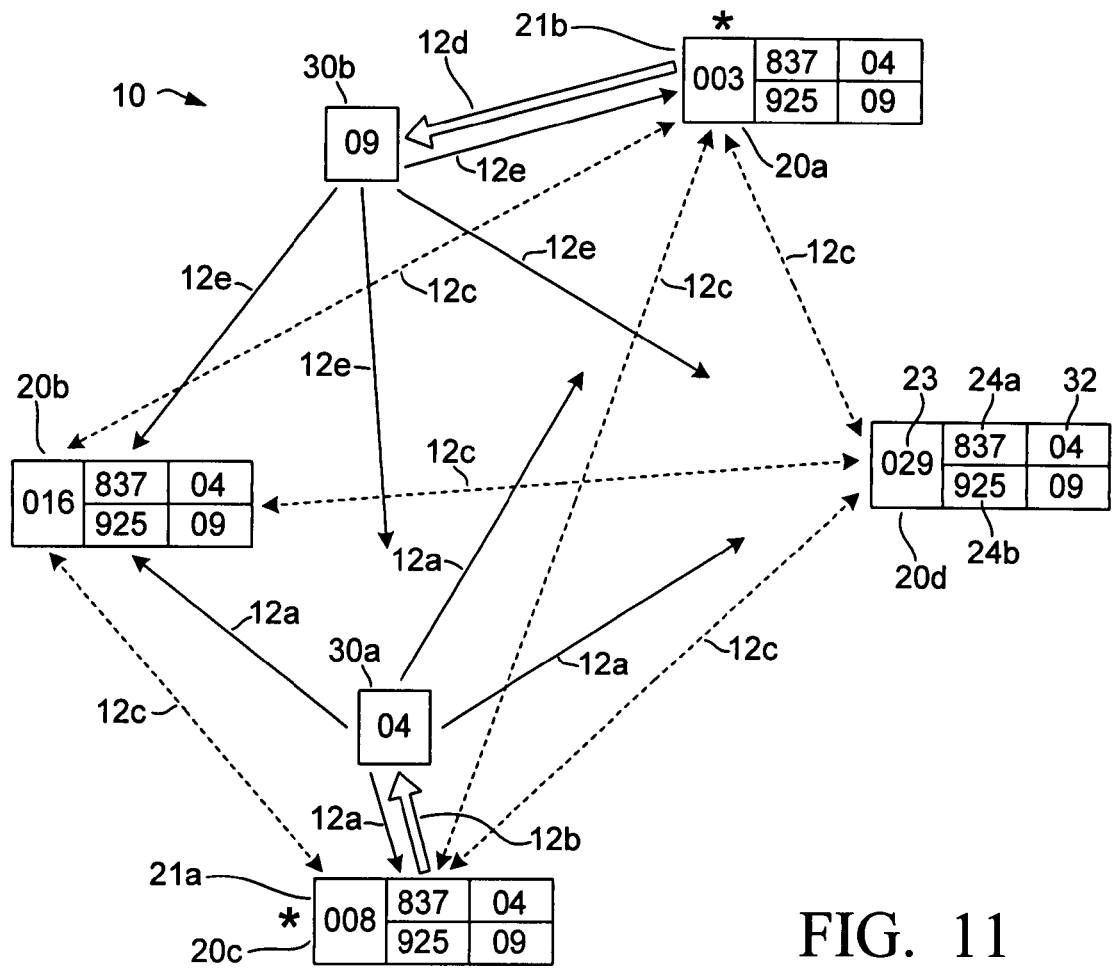
FIG. 11 depicts a communication system that includes two remote units and plural base stations, in accordance with an embodiment.

FIG. 11 depicts a communication system 10 that includes two remote units 30a and 30b and plural base stations 20a-d, in accordance with an embodiment. The embodiment of FIG. 11 is similar to that of FIG. 8 except that there are two specific remote units 30a and 30b in communication with base stations 20a-d. Where more than one remote unit 30 is present within the same wireless zone of coverage 123, the use of groups or networks based upon shared base station identifiers 24 enables communication while avoiding interference, data loss, and data contamination. The embodiment of FIG. 11 may be advantageous in a setting, such as a hospital, where each of several human patients wears a specific remote unit 30 for monitoring of a medical condition. Such an embodiment may also be advantageous in a setting, such as a nursing home, where each of several nursing home residents wears a specific remote unit 30 for tracking the location of the resident. Embodiments for tracking location using a remote unit 30 are described below in connection with FIG. 23 and FIG. 24.

Specific remote unit 30a transmits message 12a and receives message 12b. For communication with specific remote unit 30a, base stations 20a-d use shared base station identifier 24a that has the value "837". For clarity, reference number 24a is indicated for base station 20d only. At the time depicted in FIG. 11, base station 20c is the designated one 21a for transmitting a message 12b to specific remote unit 30a.

Specific remote unit 30b transmits message 12e and receives message 12d. For communication with specific remote unit 30b, base stations 20a-d use shared base station identifier 24b that has the value "925". For clarity, reference number 24b is indicated for base station 20d only. At the time depicted in FIG. 11, base station 20a is the designated one 21b for transmitting a message 12d to specific remote unit 30b.

In the embodiment of FIG. 11, separate base stations 20c and 20a serve as the designated ones 21a and 21b; in other words, the identity for designated one 21a differs from the identity for designated one 21b. Recall that the identity for a base station 20 may correspond to, for example, a physical hardware device or a portion of a hardware device or a time slice of function in a base station 20 whose function is time-sliced or a spectral band channel in a base station 20 having multiple channels that use separate spectral (frequency) bands. If the identities for designated ones 21a and 21b correspond to, for example, portions of a hardware device, then each portion of the hardware device can be available for communication with its specific remote unit 30a or 30b. Similarly, if the identities for designated ones 21a and 21b correspond to, for example, time slices of function in a base station 20 whose function is time-sliced, then each time slice of function can be available for communication with its specific remote unit 30a or 30b. Similarly, if the identities for designated ones 21a and 21b correspond to, for example, spectral band channels in a base station 20 having multiple spectral band channels, then each spectral band channel can be available for communication with its specific remote unit 30a or 30b.

In another embodiment, a single base station 20 may serve as the designated one 21a for specific remote unit 30a and may also serve as the designated one 21b for specific remote unit 30b; in other words, the identity for designated one 21a may be the same as the identity for designated one 21b. In such an embodiment, the designated one 21a-21b may sometimes be occupied by communication with one of the specific remote units 30a and 30b and may thus be unavailable for communication with the other specific remote unit 30a or 30b. In applications where reliability is critical, it may be preferable to designate separate base stations 20 having separate identities to serve as designated ones 21a and 21b, as in the embodiment of FIG. 11.

Figure 25:
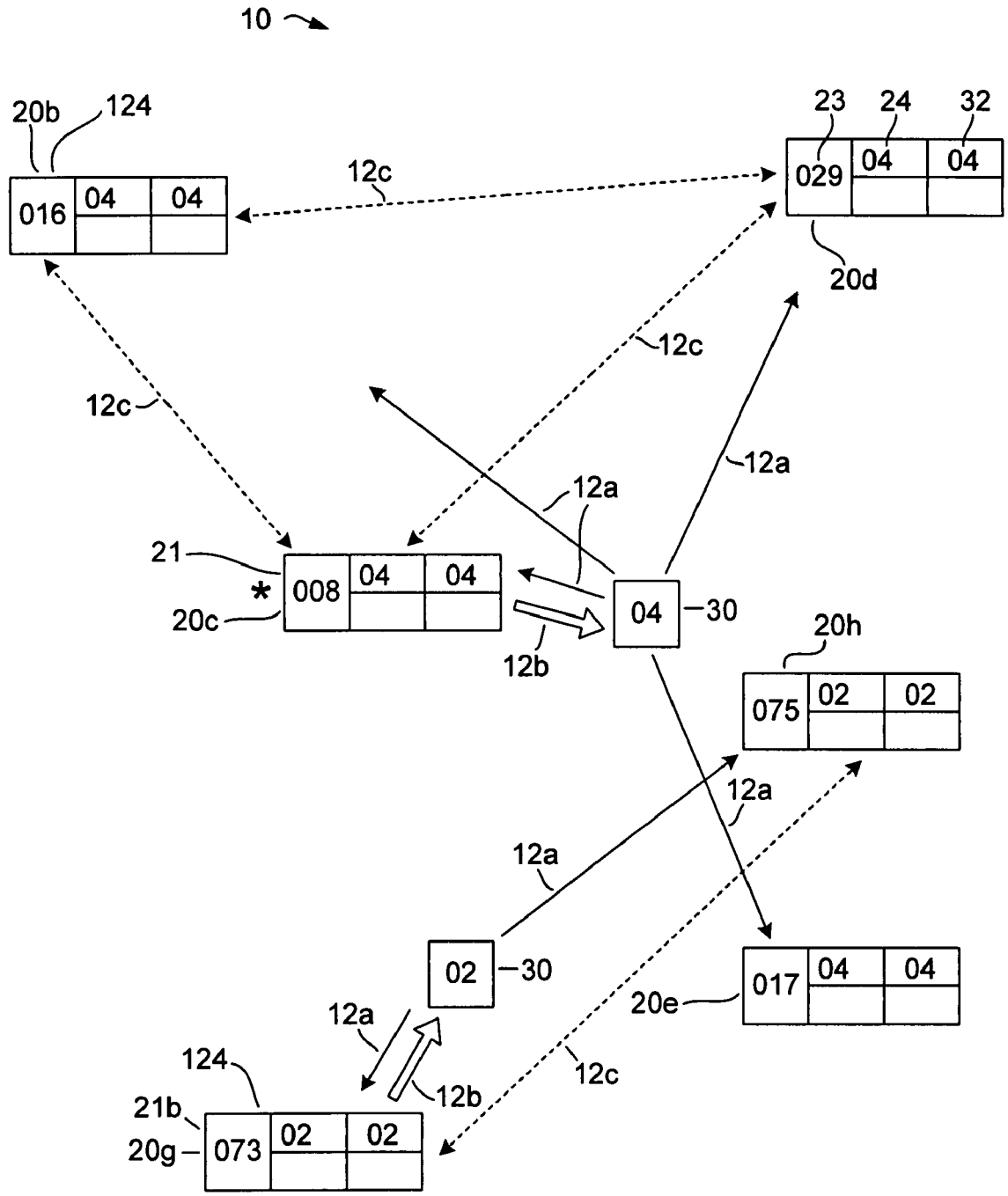
FIG. 25 depicts a communication system 10 that includes two remote units 30, in accordance with an embodiment.

In the embodiment of FIG. 11, each of base stations 20a-d communicates with specific remote unit 30a and with specific remote unit 30b. In another embodiment, different subsets of base stations 20a-d may communicate with specific remote unit 30a and with specific remote unit 30b. For example, base stations 20a, 20b, and 20d may communicate with specific remote unit 30b and base stations 20b, 20c, and 20d may communicate with specific remote unit 30a. FIG. 25 depicts an embodiment in which different subsets of base stations 20 communicate with specific remote units 30.

Figure 12:
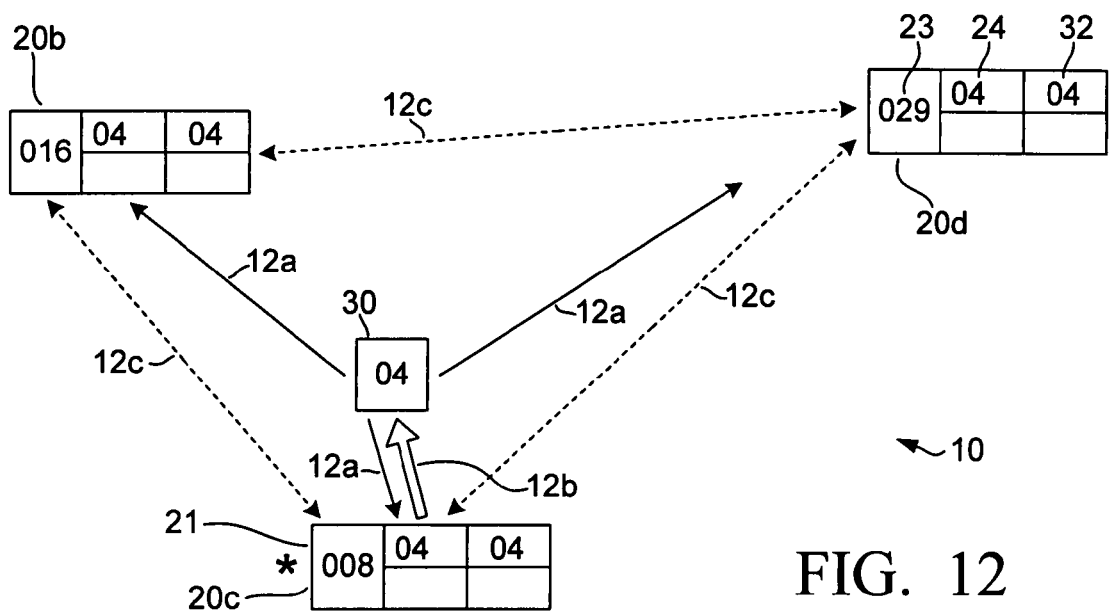
FIG. 12 depicts a communication system 10 that includes a remote unit and plural base stations, wherein a remote unit identifier for the remote unit matches a shared base station identifier that is used by the plural base stations, in accordance with an embodiment.

FIG. 12 depicts a communication system 10 that includes a specific remote unit 30 and plural base stations 20b-d, wherein a remote unit identifier 32 for the specific remote unit 30 matches a shared base station identifier 24 that is used by the plural base stations, in accordance with an embodiment. The embodiment of FIG. 12 is similar to that of FIG. 8 except that a single value "04" is used for the remote unit identifier 32 and for the shared base station identifier 24. In the embodiment of FIG. 12, the single value "04" may be viewed as a "group identifier" or "Group ID" that is used for communication between specific remote unit 30 and base stations 20b-d.

Figure 13:
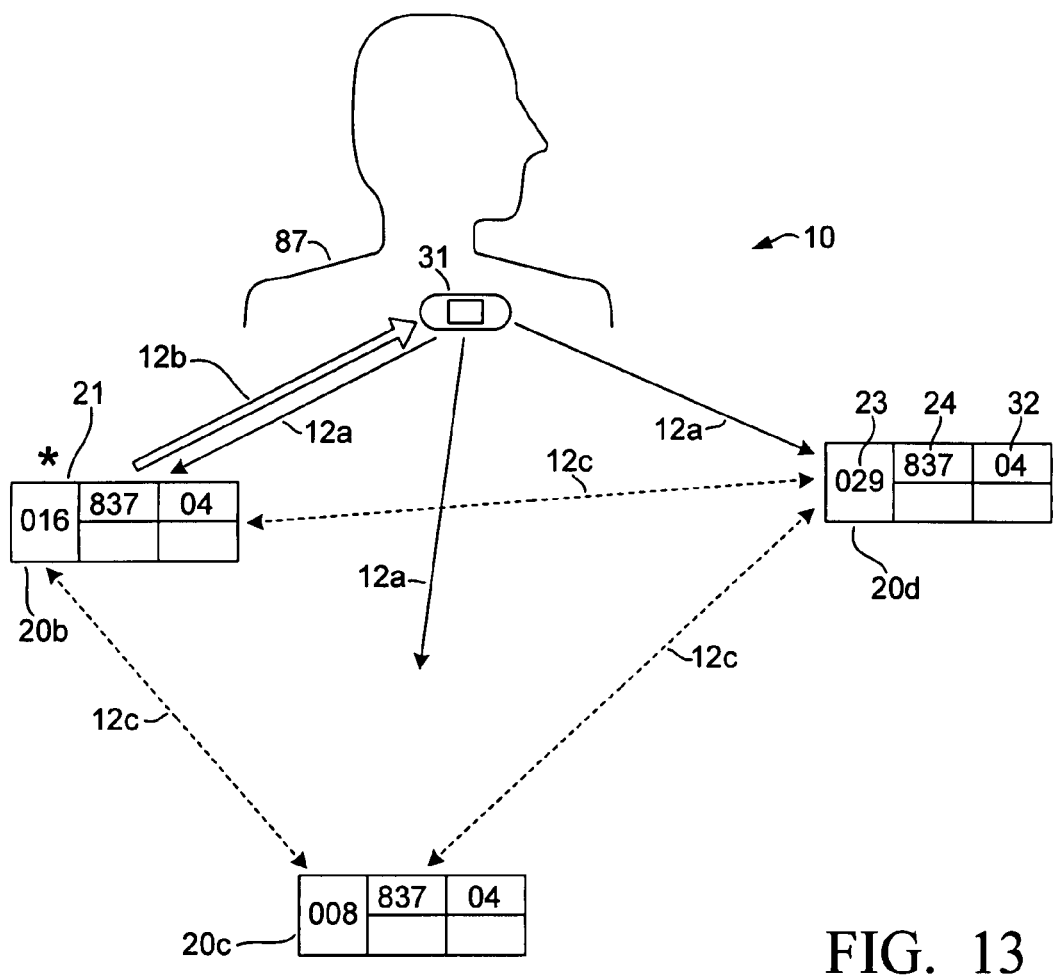
FIG. 13 depicts a communication system that includes a monitor and plural base stations, in accordance with an embodiment.

FIG. 13 depicts a communication system 10 that includes a monitor 31 and plural base stations 20b-d, in accordance with an embodiment. The embodiment of FIG. 13 is similar to that of FIG. 8. Monitor 31 of FIG. 13 is analogous to remote unit 30 of FIG. 8. In system 10 of FIG. 13, base stations 20b-d are associated in a group or network for communication via a wireless medium with a specific monitor 31. In the embodiment depicted in FIG. 13, specific monitor 31 is mounted upon an animal 87 such as a human. Any of the remote units 30 or monitors 31 described in any embodiment in this application may be mounted upon an animal 87. Mounting means that the monitor 31 (or remote unit 30) is associated with the animal 87. The human or other animal 87 may, for example, carry the monitor 31 or wear it on a belt or harness or bracelet or attach it to a wheelchair used by the human or animal. The monitor 31 may be affixed to the skin or hair of the animal and the affixing may use adhesive means. The monitor 31 may be implanted within the body, either subcutaneously or within a body cavity or within a body orifice.

Figure 14:
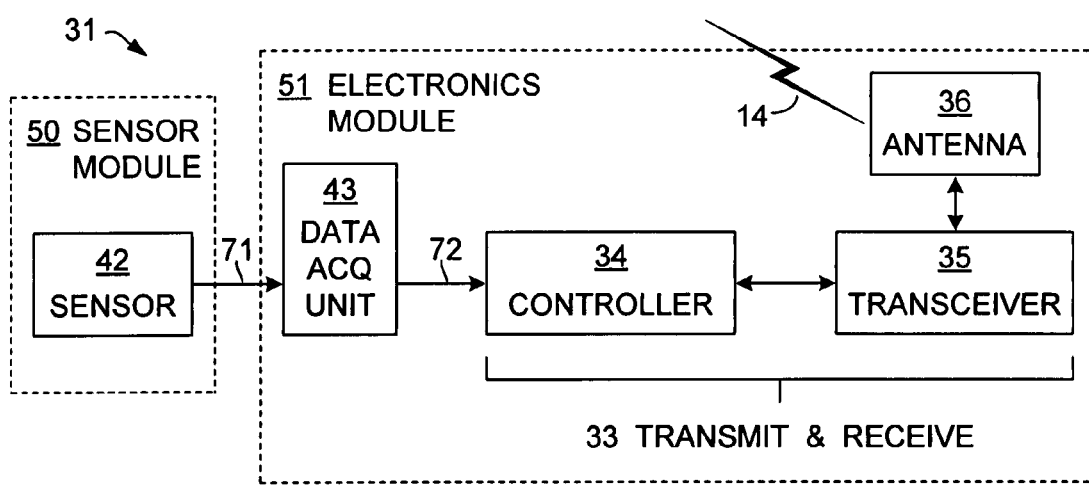
FIG. 14 is a block diagram of the monitor in the system of FIG. 13, in accordance with an embodiment.

FIG. 14 is a block diagram of the monitor 31 in the system 10 of FIG. 13, in accordance with an embodiment. Monitor 31 comprises a sensor module 50 comprising a sensor 42, and an electronics module 51. Electronics module 51 is attached to sensor module 50. In some embodiments, electronics module 51 may be removably attached to sensor module 50. The separation into sensor module 50 and electronics module 51 may be advantageous in an application where sensor 42 requires periodic replacement due to fragility, loss of function, or some other reason. In such an application, sensor module 50 may be considered a disposable module that is used with the more durable electronics module 51. The separation into sensor module 50 and electronics module 51 may also be advantageous in terms of manufacturing and assembly of monitor 31. The system 10 of FIG. 13 may be advantageous for use in monitoring applications such as medical monitoring.

Electronics module 51 comprises a data acquisition unit 43 and means for transmitting and receiving 33. Data acquisition unit 43 sends 72 data to means for transmitting and receiving 33. In another embodiment, means for transmitting and receiving 33 may additionally send information or requests or other messages to data acquisition unit 43. Means for transmitting and receiving 33 comprises a controller 34, a transceiver 35, and an antenna 36 for communication over a wireless medium 14. Sensor 42 sends 71 a signal to data acquisition unit 43. Remote unit 30 may include an analog-to-digital converter. Message 12a transmitted by specific monitor 31 may include information that is based upon data that is sent from data acquisition unit 43 to means for transmitting and receiving 33. Data that is sent from data acquisition unit 43 to means for transmitting and receiving 33 may be data that is newly acquired using sensor 42 or the data may be data that was stored within data acquisition unit 43. The information transmitted in message 12a may also be derived from information that was stored within controller 34 or within an additional memory (not shown). Controller 34 may perform various functions such as analysis of data. In another embodiment, transceiver 35 may be replaced by a separate transmitter and receiver.

Means for transmitting and receiving 33 may use various frequencies or frequency bands for transmission via wireless medium 14. In the embodiment of FIG. 13, it may be advantageous to use a frequency or frequency band that is between about 300 and 470 megahertz. In particular, it may be advantageous to use a frequency of about 418 megahertz. A frequency or frequency band that is between about 300 and 470 megahertz gives greater transmission range and more effective operation through obstructions compared to a higher frequency band such as 2.4 to 2.5 gigahertz. Furthermore, the frequency band of 2.4 to 2.5 gigahertz is absorbed by water and thus is absorbed by human or animal bodies, which consist primarily of water. For a monitor 31 that is mounted on a human, as in the embodiment of FIG. 13, it may be advantageous to avoid a frequency that is absorbed by water. A frequency or frequency band that is greater than 300 megahertz may be advantageous with respect to the size of antenna 36. A higher frequency corresponds to a lower wavelength, and a lower wavelength allows the use of a smaller antenna 36.

Sensor 42 within monitor 31 (or within a remote unit 30) may be any type of sensor or measuring means or it may comprise two or more sensors. Sensor 42 may be directed towards a medical application. Sensor 42 may comprise, for example, two or more electrodes that are used to detect an electrical signal generated by a human heart. Sensor 42 may detect temperature or sweating or specific chemical species within sweat, or sensor 42 may comprise means for detecting motion such as an accelerometer. A sensor 42 in a monitor 31 mounted on a human may be used, for example, to map or track the exposure of the human to a chemical or other environmental hazard. Sensor 42 may detect a substance such as a volatile chemical species or particulate matter or it may detect a weather condition. Information transmitted in message 12a may pertain to, for example, a physiological value or a detection of a substance or condition. The physiological value may pertain to, for example, a cardiovascular condition or a cardiac arrest.

FIG. 15 depicts the monitor 31 in the system 10 of FIG. 13, the monitor 31 comprising an electronics module 51 and a sensor module 50, in accordance with an embodiment. The embodiment depicted in FIGS. 15-19 is intended for detection of an electrical signal generated by a human heart. FIG. 17 depicts the sensor module 50 in the monitor 31 of FIG. 15, in accordance with an embodiment. Sensor module 50 comprises a substrate 52 that comprises two flexible portions 53 and a rigid portion 54. Electronics module 51, when it is attached to sensor module 50 as depicted in FIG. 15, is attached to rigid portion 54. In another embodiment, substrate 52 may not have separate flexible portions 53 and rigid portion 54. Sensor module 50 also comprises two electrodes 44 (an example of a sensor 42), two conductors 46, and two contacts 47a.

FIG. 16 is a cross-sectional view of the monitor 31 of FIG. 15, with the plane of section taken along line BB of FIG. 15, in accordance with an embodiment. A housing 57 for electronics module 51 encloses a circuit board 56. Housing 57 is attached to rigid portion 54 of sensor module 50. Housing 57 may be made, for example, of a flexible or rigid polymer that is formed by casting, overmolding, or injection molding.

FIG. 18 is a longitudinal-section view of the monitor 31 of FIG. 15, with the plane of section taken along line DD of FIG. 15, in accordance with an embodiment. In FIG. 18, monitor 31 is depicted two-fold enlarged compared to FIG. 15. Flexible portions 53 flank rigid portion 54. Flexible portions 53 are made flexible and relatively thin for comfortable attachment to a human body. Flexible portions 53 may be made of an elastomeric material such as polyurethane rubber or silicon rubber. Rigid portion 54 may be only moderately rigid; it is typically more rigid than are flexible portions 53. Rigid portion 54 is thicker than flexible portions 53 to facilitate attachment of electronics module 51. Rigid portion 54 may be made of the same material as flexible portions 53 or may be made of a different material. Forming of flexible portions 53 may begin with pre-forming a flexible piece that includes flexible portions 53 plus a flexible central region, the flexible piece having the same overall dimensions as substrate 52 (see FIG. 17). The flexible piece may be pre-formed by casting or injection molding or by punching from sheet material. Rigid portion 54 may be formed and joined with the flexible piece in various ways. For example, rigid portion 54 may be pre-formed by casting or injection molding, followed by lamination of rigid portion 54 to the flexible piece. In another example, rigid portion 54 may be overmolded upon the flexible piece.

Sensor module 50 includes two electrodes 44 that are coupled to two contacts 47a by two conductors 46. Electrodes 44 may be silver-silver chloride electrodes. Electrodes 44 may be formed by, for example, vapor deposition onto substrate 52 using a mask or by attachment of a metal foil to substrate 52. A conductive surface of each electrode 44 is exposed at the lower surface 62 of substrate 52. A conductive gel may be applied to electrodes 44 to create a good electrical connection with the skin of the human body to which sensor module 50 is secured. One suitable conductive gel is "signa gel" Electrode Gel, which is available from Parker Laboratories, Fairfield, N.J. 07004. A foam disk may be used as a porous substrate that holds the conductive gel in contact with each electrode 44. The foam disk may be secured to electrode 44 using a small adhesive spot, and the conductive gel may then be loaded onto the foam disk. For securing sensor module 50 to human skin, the lower surface 62 may be coated with adhesive in the regions not occupied by electrodes 44. For example, an adhesive ring or an annular region of adhesive may be applied to lower surface 62; the adhesive ring may surround electrode 44 and the conductive gel, preventing the conductive gel from drying or washing away. A release barrier film may be used to cover the adhesive ring, electrode, and conductive gel until the time when the sensor module 50 is secured to the human body.

Conductors 46 couple electrodes 44 to contacts 47a. Contacts 47a are exposed on the upper surface 61 of substrate 52, while electrodes 44 are exposed on the lower surface 62 of substrate 52. Conductors 46 may be made of a metal such as silver. Conductors 46 may made in various ways: for example, conductors 46 may be made of wire or insulated wire or may be formed by vapor deposition of metal onto substrate 52 using a mask. A passage that links lower surface 62 to upper surface 61 may be provided so that conductors 46 connect to electrodes 44 (exposed at lower surface 62) and also to contacts 47a (exposed at upper surface 61). To prevent formation of a water bridge that includes a conductor 46, it may be advantageous to enclose conductors 46 within substrate 52. For example, substrate 52 may be formed as a layered structure with a lower layer and an upper layer and with conductors 46 disposed between the lower layer and the upper layer. Contacts 47a press against aligned contacts 47b on circuit board 56, forming an electrical coupling between sensor module 50 and electronics module 51.

To prevent formation of a water bridge on the upper surface 61 of rigid portion 54 in the space between rigid portion 54 and circuit board 56, it may be advantageous to exclude water from that space or to spatially segregate water within that space. Spatial segregation of water may be effected by, for example, a ridge or dam that extends upward from rigid portion 54 and that presses against the underside of circuit board 56.

FIG. 19 is a cross-sectional view of the monitor 31 of FIG. 15, with the plane of section taken along line BB of FIG. 15, in accordance with an embodiment. The embodiment of FIG. 19 is similar to that of FIG. 16 except that the electronics module 51 is removably attached to the sensor module 50. Housing 57 of electronics module 51 is removably attached to rigid portion 54 of sensor module 50 by means of two notches 60 that receive rigid portion 54. To release rigid portion 54 from housing 57, one squeezes housing 57 by pressing upon upper portions 59 of sides 58 of housing 57. Squeezing upper portions 59 causes sides 58 to pivot outward slightly at their lower edges, causing notches 60 to release rigid portion 54. To insert rigid portion 54 into housing 57, one squeezes housing 57 as described previously and inserts rigid portion 54 into notches 60. Removable attachment of electronics module 50 to sensor module 51 may be advantageous in an application where a sensor 42 such as electrode 44 requires periodic replacement due to fragility, loss of function, or some other reason, such as replenishment of the conductive gel that is applied to electrodes 44.

Figure 20:
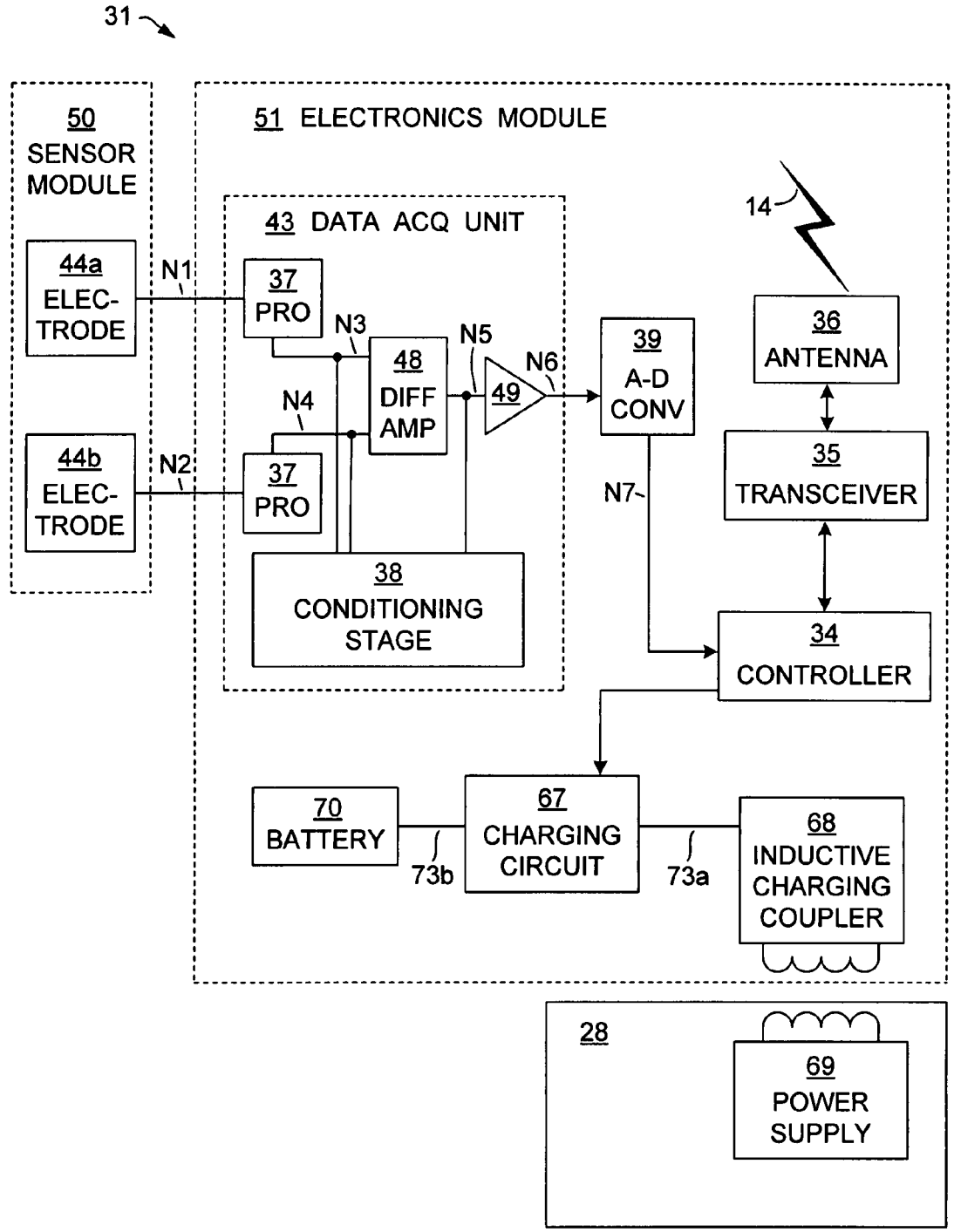
FIG. 20 depicts a monitor together with a device that is capable of charging a battery for the monitor, the monitor being depicted as a block diagram, in accordance with an embodiment.

FIG. 20 depicts a monitor 31 together with a device 28 that is capable of charging a battery 70 for monitor 31, monitor 31 being depicted as a block diagram, in accordance with an embodiment. Additional information about monitor 31 is provided following the discussion of FIG. 25. The monitor 31 depicted in the embodiment of FIG. 20 is intended for detection of an electrical signal generated by a human heart. Monitor 31 comprises a sensor module 50 and an electronics module 51. In the embodiment of FIG. 20, the two electrodes 44a,b within sensor module 50 are analogous to sensor 42 of FIG. 14. Each electrode 44a,b sends a signal to a data acquisition unit 43 within electronics module 51. Electronics module 51 comprises data acquisition unit 43, an analog-to-digital converter 39, and means for transmitting and receiving that comprises a controller 34, a transceiver 35, and an antenna 36 for communication over a wireless medium 14. Electronics module 51 further comprises a charging circuit 67, an inductive charging coupler 68, and a battery 70. Controller 34 may perform various functions such as analysis of data. In another embodiment, transceiver 35 may be replaced by a separate transmitter and receiver.

Data acquisition unit 43 comprises two protection stages 37, a conditioning stage 38, a differential amplifier 48, and a gain amplifier 49. Protection stages 37 serve to protect electronics module 51 against damage caused by excessive current or voltage received on conductors N1 and N2. Excessive current or voltage may occur, for example, because of static electricity. Monitor 31 is intended for attachment to the body of a human; if a large pulse of electricity is applied to the body to restore a normal heart rhythm (defibrillation), the large pulse of electricity can cause excessive current or voltage on conductors N1 and N2.

In the embodiment of FIG. 20, electrodes 44a and 44b are attached to a human body at different positions in order to read the electrical potential or voltage difference between the two positions. Existing devices for measuring an electrical potential generated by a human heart typically include a third or reference electrode. Existing devices typically measure the differential voltage between electrodes 44a and 44b. All or some portion of any common mode voltage for electrodes 44a and 44b may be fed to the third or reference electrode. Monitor 31 omits the third or reference electrode, and this omission allows monitor 31 to be significantly smaller than typical existing devices for measuring an electrical potential generated by a human heart.

Conditioning stage 38 replaces the third or reference electrode. Conditioning stage 38 applies a reference voltage Vref to drive each of electrodes 44a and 44b so that the average voltage of electrodes 44a and 44b is equal to Vref. Vref is a reference voltage for electronics module 51.

Differential amplifier 48 determines the electrical potential or voltage difference between conductors N3 and N4 and outputs the voltage difference on conductor N5. Gain amplifier 49 amplifies the voltage difference, and outputs the resulting voltage on conductor N6. Analog-to-digital converter 39 converts the analog voltage to digital data which is output on conductor N7. The data on conductor N7 may be stored in a memory (not shown) and the data may be transmitted on a wireless medium 14 by controller 34, transceiver 35, and antenna 36.

Battery 70 supplies power to data acquisition unit 43, analog-to-digital converter 39, controller 34, and transceiver 35. In the embodiment of FIG. 20, battery 70 is a rechargeable battery that may be recharged when monitor 31 is docked in a device 28. Inductive charging coupler 68 receives power from power supply 69 in device 28. Inductive charging coupler 68 outputs power on conductor 73a, and the power is received by charging circuit 67 which is controlled by controller 34. Charging circuit 67 outputs power on conductor 73b, and the power is stored in battery 70.

Figure 21:
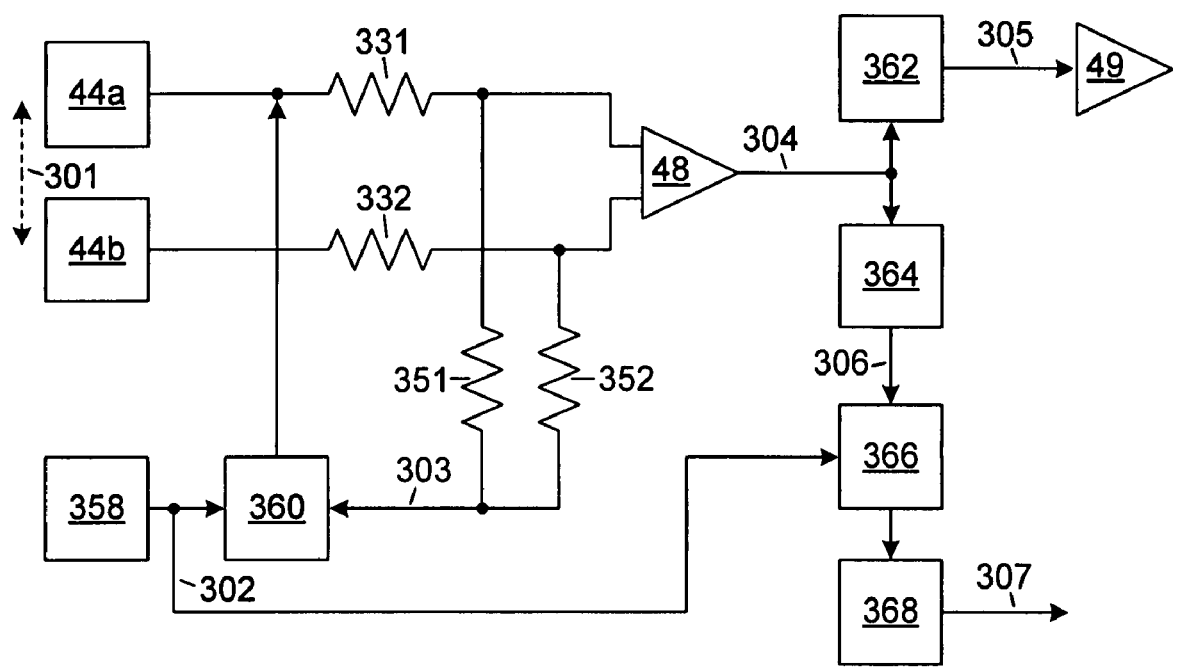
FIG. 21 is a block diagram of a circuit for continuous monitoring of electrode impedance, in accordance with an embodiment.

FIG. 21 is a block diagram of a circuit for continuous monitoring of impedance of electrodes 44, in accordance with an embodiment. The embodiment of FIG. 21 may be incorporated into a monitor 31 such as the embodiment of FIG. 20. It may be advantageous to continually monitor impedance of electrodes 44, because excessive impedance can attenuate the signal from an electrode 44 and can introduce noise that impairs detection of the signal. Continuous monitoring of impedance is accomplished by applying a test signal Vgen 302 to one electrode 44a and measuring a voltage 307 whose amplitude is linearly proportional to the sum of the resistances of the two electrodes 44a and 44b and the resistance of the biological sample, which typically is negligible compared to the electrode resistances.

The embodiment of FIG. 21 comprises two electrodes 44a and 44b that are coupled to differential amplifier 48 through input resistors 331 and 332. Vbody 301 is the biological signal (voltage difference) that is to be measured using electrodes 44a and 44b. Each input to differential amplifier 48 is also coupled to a current source 360 through reference resistors 351 and 352. The resistances of references resistors 351 and 352 are much larger than the resistances of input resistors 331 and 332 to avoid attenuation of the signals received by differential amplifier 48. Reference voltage Vref 303 is the average of the signals from electrodes 44a and 44b, as described in connection with conditioning stage 38 of FIG. 20. Signal generator 358 generates a signal Vgen 302, which is a constant AC signal generated with respect to Vref 303. Current source 360 applies signal Vgen 302 to electrode 44a.

Differential amplifier 48 outputs signal 304 which is an amplified differential signal that is a function of Vbody 301 and Vgen 302. Band-pass filter 362 receives signal 304 and blocks Vgen 302 and outputs signal 305 which is the amplified biological signal Vbody 301. Gain amplifier 49 receives signal 305. Band-pass filter 364 receives signal 304 and blocks Vbody 301 and outputs signal 306 which is the amplified test signal Vgen 302. Multiplier 366 receives signal 306 and extracts the amplitude and square of the Vgen 302 components in signal 306. Low-pass filter 368 removes the non-amplitude components of the amplified signal received from multiplier 366 and outputs signal 307 whose amplitude is proportional to the summed resistance of electrodes 44a and 44b.

The applied signal Vgen 302 preferably conforms to the following criteria. First, Vgen 302 does not interfere with the signal such as Vbody 301 that is being measured; this may be achieved by using a frequency range for Vgen 302 that is will outside of the band of the signal to be measured. Second, Vgen 302 is not of the same frequency as existing or expected environmental or physiological noise, such as 60 Hertz electrical noise that is common in the United States. Third, the peak current for Vgen 302 is small enough to avoid any risk of harm to a human subject to which electrodes 44 are attached. Finally, as is known in the art, the frequency is chosen for compatibility with the conductivity band of the biological sample and of electrodes 44, and it should not affect the sample impedance at the frequency range of the signal to be measured.

Figure 22:
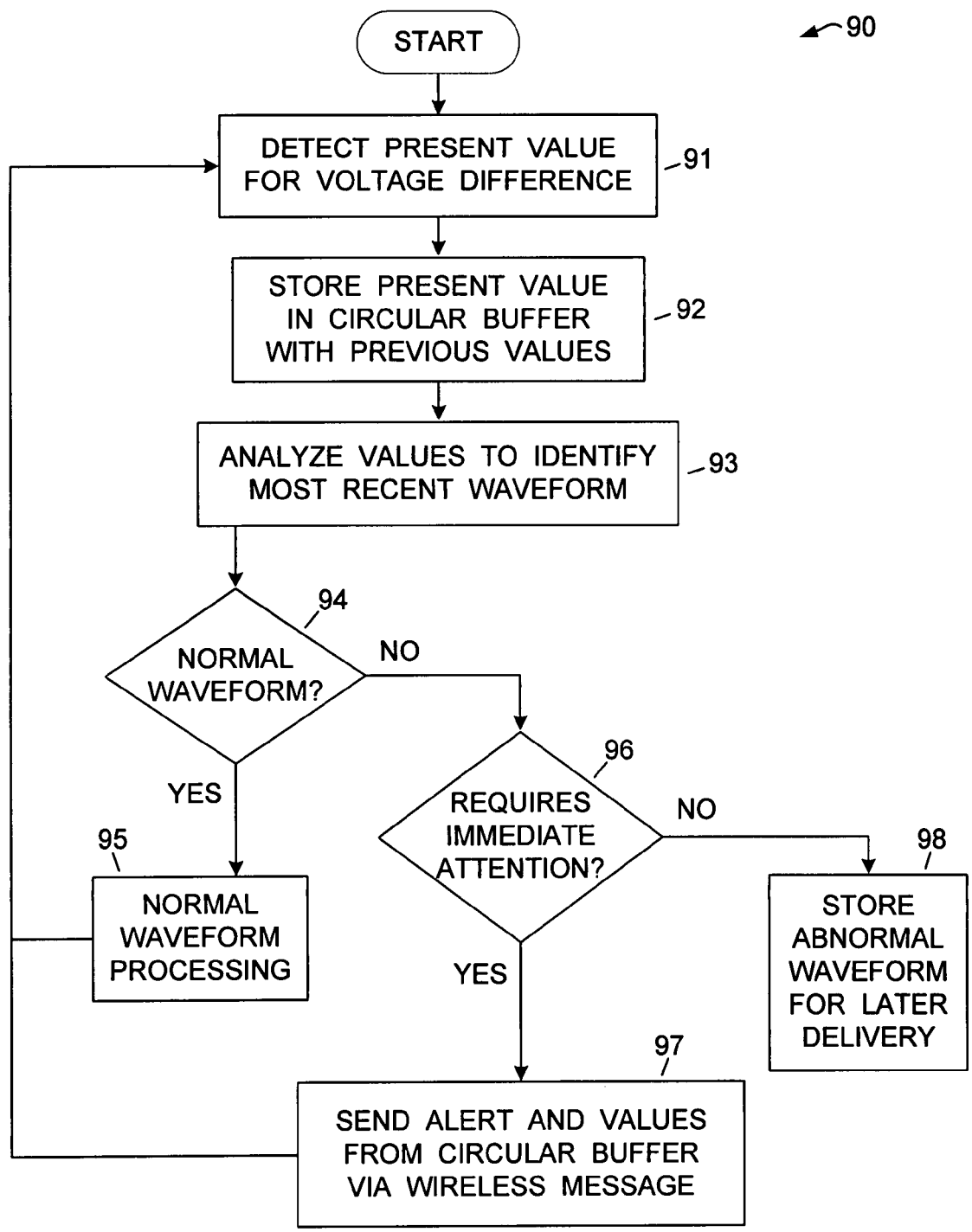
FIG. 22 is a simplified flowchart that depicts a method for analyzing an electrical signal generated by a human heart.

FIG. 22 is a simplified flowchart that depicts a method 90 for analyzing an electrical signal generated by a human heart. The electrical signal may be obtained using a device or monitor 31 having two or more electrodes located at different positions on a human body, the monitor 31 detecting a voltage difference between two electrodes. In an initial data acquisition step (step 91), the present value for the voltage difference is detected, and the present value may be stored in a temporary buffer. The present value is then stored in a circular buffer (step 92) together with a set of values acquired at previous times. The sampling frequency for detecting the present value of the voltage difference may be, for example, 100 times per second or 300 times per second. When the present value is added to the circular buffer, the oldest value that was previously stored in the circular buffer is discarded. The circular buffer may have, for example, storage capacity for storing values collected during a period of one hour.

The set of values stored in the circular buffer represents a recording of the voltage difference as a function of time. If the values were plotted on a graph where the horizontal axis indicates time and the vertical axis indicates voltage, the graph would correspond to the familiar electrocardiogram (ECG). An ECG for a normally functioning heart displays a repeating waveform having a characteristic set of peaks and valleys that represents one cardiac cycle or heartbeat. The amplitudes and spacings of the peaks and valleys generally fall within certain ranges, although some individual variation exists even in healthy persons. The set of values is analyzed (step 93) to identify the most recent waveform or heartbeat. The most recent waveform is checked to determine whether it is normal (step 94). The determination of normality may be based upon comparing the most recent waveform to a stored waveform or template which represents a past waveform for the individual human whose heart signal is currently being monitored. If the most recent waveform is normal, normal waveform processing occurs (step 95). Normal waveform processing may entail storage of some information, such as the start time of the waveform; typically the most recent waveform is discarded. The set of values in the circular buffer, from which the most recent waveform was identified, is still stored in the circular buffer, however; the set of values is not discarded.

If the most recent waveform is abnormal, then the most recent waveform is checked (step 96) to determine whether the monitored human requires immediate attention. Immediate attention may be warranted if the most recent waveform exhibits a severely aberrant rhythm. Immediate attention is definitely required if the most recent waveform exhibits only minor fluctuations in voltage without regularly spaced peaks, indicating cessation of cardiac electrical activity. Cessation of cardiac electrical activity is known as cardiac arrest. If the determination indicates that immediate attention is required, a message is transmitted via a wireless medium (step 97). The message comprises an alert seeking immediate attention for the monitored human. The message also comprises the set of values stored in the circular buffer. As noted previously, the circular buffer may have storage capacity for storing values collected during a period of one hour. The set of values in the circular buffer thus corresponds to a record of cardiac activity during a one hour period prior to the severely aberrant waveform. This record of cardiac activity may be of use to a clinician or other emergency responder who responds to the alarm sent in the message.

A base station 20 receives the message comprising the alert and the set of values. Base station 20, or another base station 20 or other device that is part of a group or network of devices that are capable of communicating with one another, has means for communicating with entities outside of the group or network, as described in connection with FIG. 8. The means for communicating is used to summon assistance for the monitored human. For example, an audible buzzer may serve to summon assistance from a family member or a nursing home assistant. For example, a message transmitted on a telephone connection or on an internet connection may serve to summon assistance from a neighbor or from an emergency responder who may be located in, for example, a municipal public safety department. The assistance provided to the monitored human may include, for example, use of a defibrillator to restart a normal cardiac rhythm.

If the most recent waveform is abnormal but the determination indicates that immediate attention is not required, the most recent waveform is stored for delivery later (step 98). One or more abnormal waveforms that are stored on the monitor 31 may be delivered later to another device such as a base station 20. For example, the waveforms may be transferred to another device while the monitor is docked in the device for battery recharging. Transferring the abnormal waveforms during the docked period, rather than transferring the abnormal waveforms over a wireless medium, may be advantageous because the monitor avoids using battery power to transmit a wireless message.

In an alternative embodiment (not depicted), only certain of the steps of method 90 are performed by monitor 31, while other steps of method 90 may be performed by another device such as a base station 20. For example, monitor 31 may perform steps 91 and 92 as in method 90. Monitor 31 may also periodically transmit a message via a wireless medium, the message comprising all or a portion of the set of values stored in the circular buffer. For example, monitor 31 may transmit a message once every 30 seconds, the message comprising the set of values recorded during the most recent 60 seconds. Base station 20 receives the message and analyzes the set of values as described for steps 93, 94, 95, 96, and 98. If the determination in step 96 indicates that the monitored human requires immediate attention, then assistance is summoned as described in connection with method 90.

Figure 23:
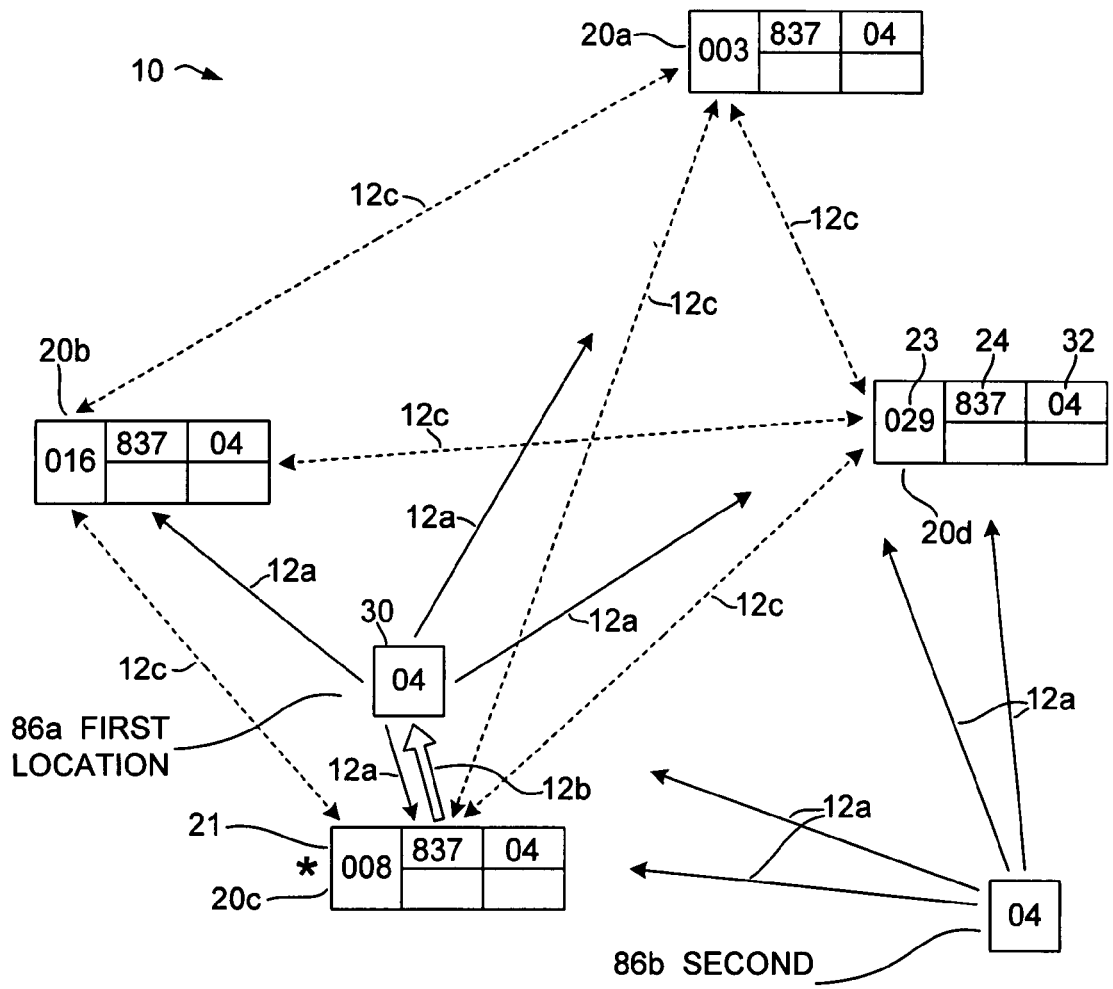
FIG. 23 depicts a communication system that includes a remote unit and plural base stations and that may be used to track the location of the remote unit, in accordance with an embodiment.

FIG. 23 depicts a communication system 10 that includes a remote unit 30 and plural base stations 20 and that may be used to track the location of the remote unit 30, in accordance with an embodiment. The embodiment of FIG. 23 is similar to that of FIG. 8 except that remote unit 30 is depicted in two separate locations, a first location 86a and a second location 86b. The first location 86a is the location for remote unit 30 during a first time period, and the second location 86b is the location for remote unit 30 during a second time period. Remote unit 30 transmits a first message 12a during the first time period and transmits a second message 12a during the second time period. Each message 12a comprises a remote unit identifier. In the embodiment depicted in FIG. 23, the remote unit identifier has the value "04". During the first time period, first message 12a is received by at least one of base stations 20a-d. In fact, base stations 20 b and 20c are both within range and are able to receive the first message 12a. During the second time period, remote unit 30 has moved to second location 86b. When remote unit 30 is at second location 86b, all of the base stations 20a-d are out of range, and none of base stations 20a-d receives the second message 12a. The failure to receive the second message 12a causes an alert to be generated.

The embodiment of FIG. 23 may be advantageous for monitoring the location of a person who might be endangered by straying, such as a child or an elderly person whose memory is impaired. The embodiment of FIG. 23 may be advantageous in a setting such as a nursing home, where each of several nursing home residents could wear a specific remote unit 30 for tracking the location of the resident. As described previously in connection with FIG. 11, two or more remote units 30 may be in communication with a group or network of base stations 20. In another embodiment (not depicted) that is similar to the embodiment of FIG. 23, the first message 12a and the second message 12a each comprise the shared base station identifier 24 instead of the remote unit identifier. During the first time period, first message 12a comprising base station identifier 24 is received by at least one of base stations 20a-d. During the second time period, none of base stations 20a-d receives second message 12a comprising base station identifier 24. The failure to receive second message 12a causes an alert to be generated.

In another embodiment (not depicted) that is similar to the embodiments of FIGS. 10A and 10B and FIG. 23, an approximate location for remote unit 30 is determined based upon which of base stations 20a-d receives a message 12a. If only one base station 20 receives message 12a, it is likely that the location for remote unit 30 is nearest to the base station 20 that receives message 12a. If more than one base station 20 receives message 12a, then the signal-to-noise ratio for message 12a received by individual base stations 20 may correlate with the relative proximity of remote unit 30 to any individual base station 20. Thus, an approximate location for remote unit 30 may be determined at least partially based upon the signal-to-noise ratio.

Figure 24:
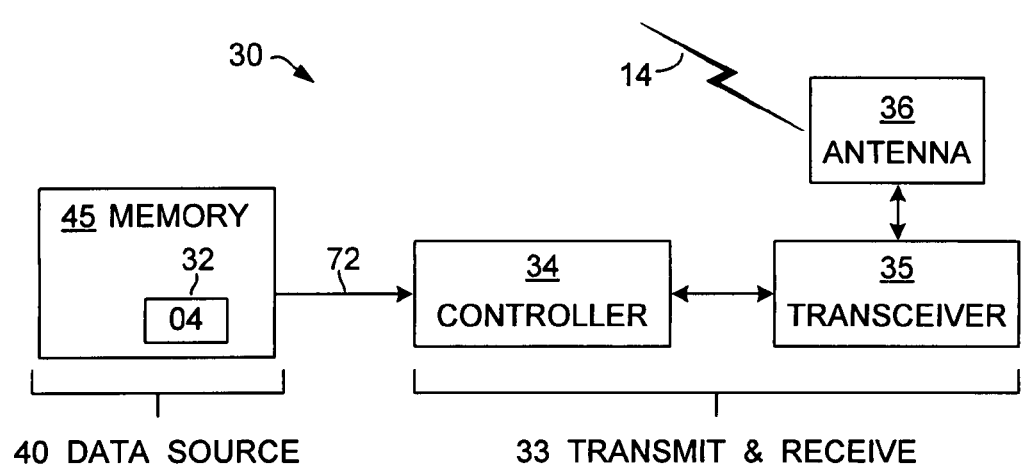
FIG. 24 is a block diagram of the remote unit in the system of FIG. 23.

FIG. 24 is a block diagram of the remote unit 30 in the system of FIG. 23. The embodiment of FIG. 24 is similar to that of FIG. 9, except that in FIG. 24 data source 40 comprises a memory 45 rather than a sensor 42 and a data acquisition unit 43. Memory 45 stores remote unit identifier 32, which has the value "04". Message 12a transmitted by remote unit 30 comprises remote unit identifier 32. In an alternative embodiment described above in connection with FIG. 23, message 12a comprises base station identifier 24. In such an embodiment, base station identifier 24 may be stored in memory 45. In an another embodiment, remote unit identifier 32 or base station identifier 24 may be stored in a different memory such as memory that is within controller 34.

ADDITIONAL EMBODIMENTS

Several additional terms are defined as follows.

Device: A piece of equipment that exchanges information with the other pieces of equipment in the system, regardless of whether it contributes new information or not, even if it is not essential to the system's functionality. A base station 20 is one example of a device 28. A docking station for a remote unit 30 is another example of a device 28.

Sub-Network: A set of one or more devices 28 within a group or network, none of which devices 28 is a remote unit 30, that are currently in communication with one another. While all devices 28 within a group or network use the same shared base station identifier 24, communication between devices in separate sub-networks may be temporarily impaired because of e.g. interference.

Master: The device 28 in a sub-network that is responsible for coordinating functionality of devices 28 within the sub-network.

Connected: The state of a sub-network that includes a designated base station 20 that is in communication with a remote unit 30; communication includes receiving messages 12a from the remote unit 20 and acknowledging these messages. The connected state also applies to any device 28 within a connected sub-network.

Disconnected: The state of a device 28 or sub-network that is not connected.

Maximum Transmission Interval (MTI): The MTI applies to packets transmitted by the remote unit 30 and received by a base station 20. The MTI is the maximum length of time that is expected to elapse between transmitting of packets by the remote unit 30. If a packet is not received within the MTI, this may indicate that the packet is lost.

FIG. 25 depicts a communication system 10 that includes two remote units 30, in accordance with an embodiment. The embodiment of FIG. 25 is similar to that of FIG. 1, except that in the embodiment of FIG. 25 different subsets of base stations 20 communicate with specific remote units 30. In this embodiment, base stations 20b, 20c, 20d, and 20e communicate with the remote unit 30 for which the remote unit identifier 32 has the value "04", while base stations 20g and 20h communicate with the remote unit 30 for which the remote unit identifier 32 has the value "02". Base stations 20b and 20g are the masters 124 for their respective sub-networks. The embodiment of FIG. 25 is similar to that of FIG. 12, in that for each remote unit 30, a single value is used for both the remote unit identifier 32 and for the shared base station identifier 24. The single value "04" is used for one group or network, and the single value "02" is used for the other group or network. In the embodiment of FIG. 25, the single value "04" or "02" may be viewed as a "group identifier" or "Group ID" that is used for communication between specific remote unit 30 and base stations 20. At the time depicted in FIG. 25, base station 20e is not in communication with the other base stations 20b, 20c and 20d in its sub-network, as indicated by the lack of messages 12c, possibly due to interference. Base station 20e is still receiving from remote unit 30 ("04"). As noted previously, a group or network may also include one or more non-base station device 28 (not depicted) that communicates via messages 12c with other devices 28, such as base stations 20, within the group or network. As described below, messages 12a, 12b, and 12c may be transmitted and received using "data packets" or "packets".

FIG. 20, presented previously, depicts a monitor 31 together with a device 28 that is capable of charging a battery 70 for monitor 31. Controller 34 may be, for example, a microcontroller such as an ATMEGA 16 manufactured by Atmel. Controller 34 may include means for storing programs and data, or electronics module 51 may include separate storage means. Transceiver 35 is a radio transceiver circuit suited for control by and transmission from and to controller 34. The CC2420 by Chipcon is an example of a suitable radio transceiver circuit. Transceiver 35 sends and receives radio transmissions via antenna 36 which is designed or chosen so as to be suited to the operating frequency of the transmissions. One suitable antenna is 4311-111-00245 by Yageo. It will be recognized by those skilled in the art that other common interconnection circuitry must be added as necessary, such as voltage regulators to adapt the battery voltage to levels required by different components, and so forth. In another embodiment, transceiver 35 may be replaced by a separate transmitter and receiver.

In operation, according to one embodiment, controller 34 receives data from data acquisition unit 43 via analog-to-digital converter 39 and accumulates data until it has enough to fill a data packet. When a packet is ready, it is transferred to transceiver 35, and then controller 34 instructs transceiver 35 to transmit the packet. At the end of transmission, controller 34 turns off transceiver 35, waits a pre-determined delay, and then turns on transceiver 35 in receive mode to receive any data from the designated base station 20. If the data do not start to arrive within a pre-determined time period, controller 34 turns off transceiver 35 and moves on to the next packet. If the communications protocol specifies an acknowledgement for each packet, and if no acknowledgement is received, then controller 34 may repeat the transmission and receive cycle. The use of acknowledgements allows remote unit 30 to know that its connection may have dropped and that it needs to establish a new connection. Embodiments described below assume the use of acknowledgements.

Figure 26:
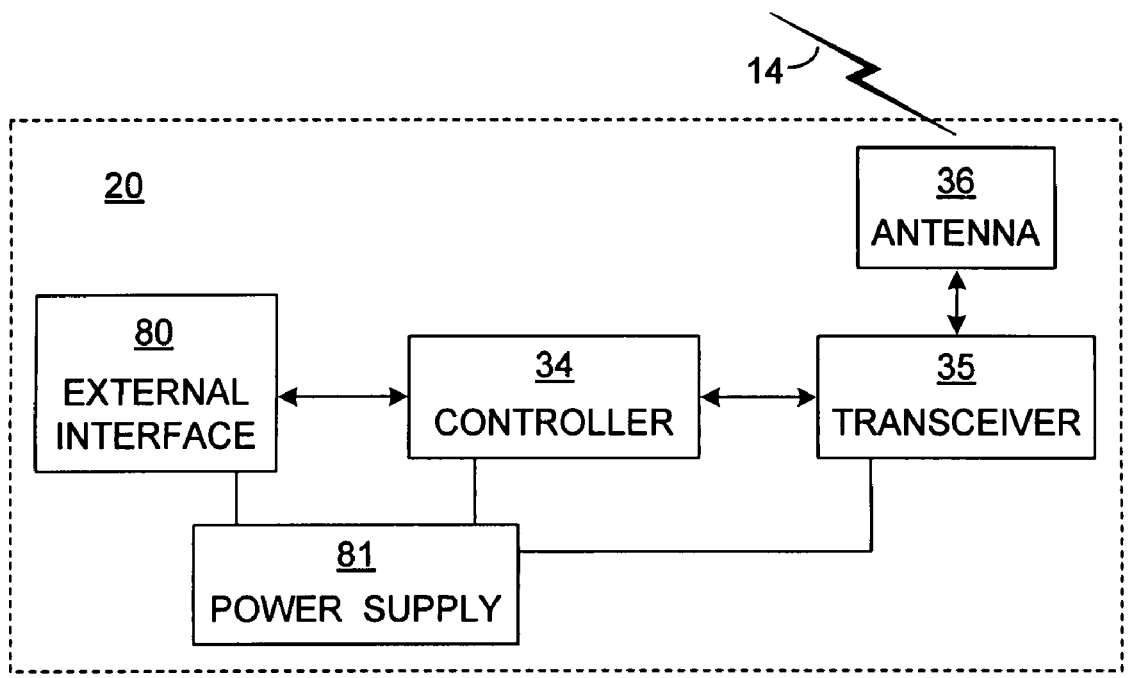
FIG. 26 is a block diagram for a base station, in accordance with an embodiment.

FIG. 26 is a block diagram for a base station 20, in accordance with an embodiment. Controller 34 may be, for example, a microcontroller such as an ATMEGA 64 manufactured by Atmel. Controller 34 may include means for storing programs and data, or base station 20 may include separate storage means. Transceiver 35 is a radio transceiver circuit suited for control by and transmission from and to controller 34. The CC2420 by Chipcon is an example of a suitable radio transceiver circuit. Transceiver 35 sends and receives radio transmissions via antenna 36 which is designed or chosen so as to be suited to the operating frequency of the transmissions. One suitable antenna is 4311-111-00245 by Yageo. Power is provided by a power supply 81. External interface 80 enables controller 34 to communicate with other devices 28 within the group or network and also to communicate with distant entities. It will be recognized by those skilled in the art that other common interconnection circuitry must be added as necessary, such as voltage regulators to adapt the battery voltage to levels required by different components, and so forth. In another embodiment, transceiver 35 may be replaced by a separate transmitter and receiver.

In operation, according to one embodiment, controller 34 within base station 20 configures transceiver 35 to receive (listen for transmissions) until a packet is received. When a packet is received, controller 34 checks the packet to determine whether the packet is destined for this group or network that includes the base station 20. If the shared base station identifier 24 within the packet corresponds to the shared base station identifier 24 for this group or network, this indicates that the packet is intended for this group or network. If the shared base station identifier 24 differs from the one for this group or network, then the packet is ignored and controller 34 goes back to waiting for a transmission, with transceiver 35 still in receive mode. If the packet is intended for this group or network and if base station 20 is the designated one, then controller 34 determines a response, waits a predetermined delay if necessary, passes the response to transceiver 35, switches transceiver 35 to transmit mode, and instructs transceiver 35 to transmit the response to the specific remote unit 30. While transceiver 35 is transmitting the response, controller 34 pre-processes the received data from the packet as needed and sends the data to other devices 28, such as other base stations 20, via external interface 80.

Figure 27:
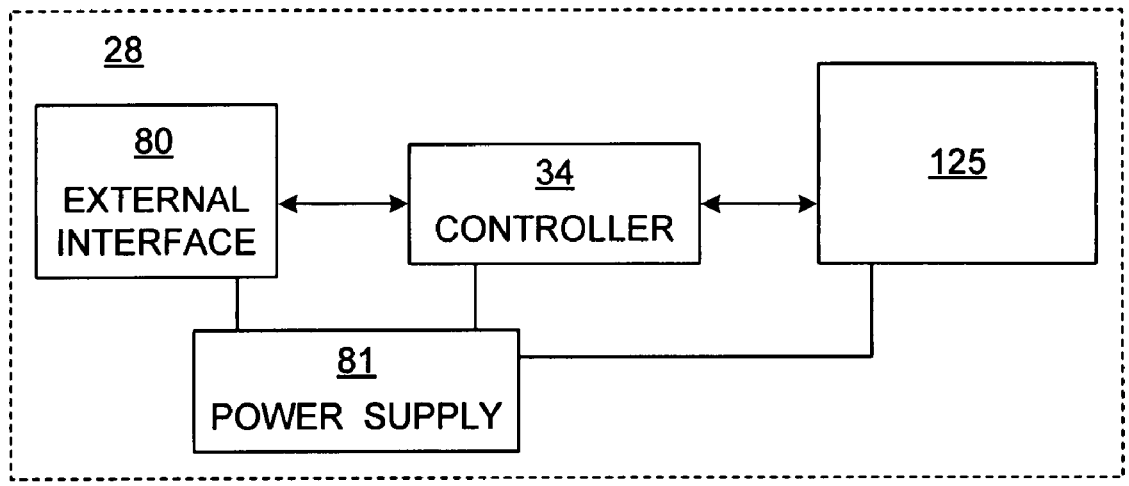
FIG. 27 is a block diagram for a device, within a group or network, that is neither a remote unit nor a base station, in accordance with an embodiment.

FIG. 27 is a block diagram for a device 28, within a group or network, that is neither a remote unit 30 nor a base station 20, in accordance with an embodiment. Device 28 is similar to base station 20 except that device 28 lacks a transceiver 35 and antenna 36 and instead includes other means 125 for providing functions performed by device 28. Such means 125 and associated functions may include, for example, data storage means, user interface means, alarm siren means, battery charger means for charging remote unit 30, or information transfer means for downloading data stored within remote unit 30.

Figure 28:
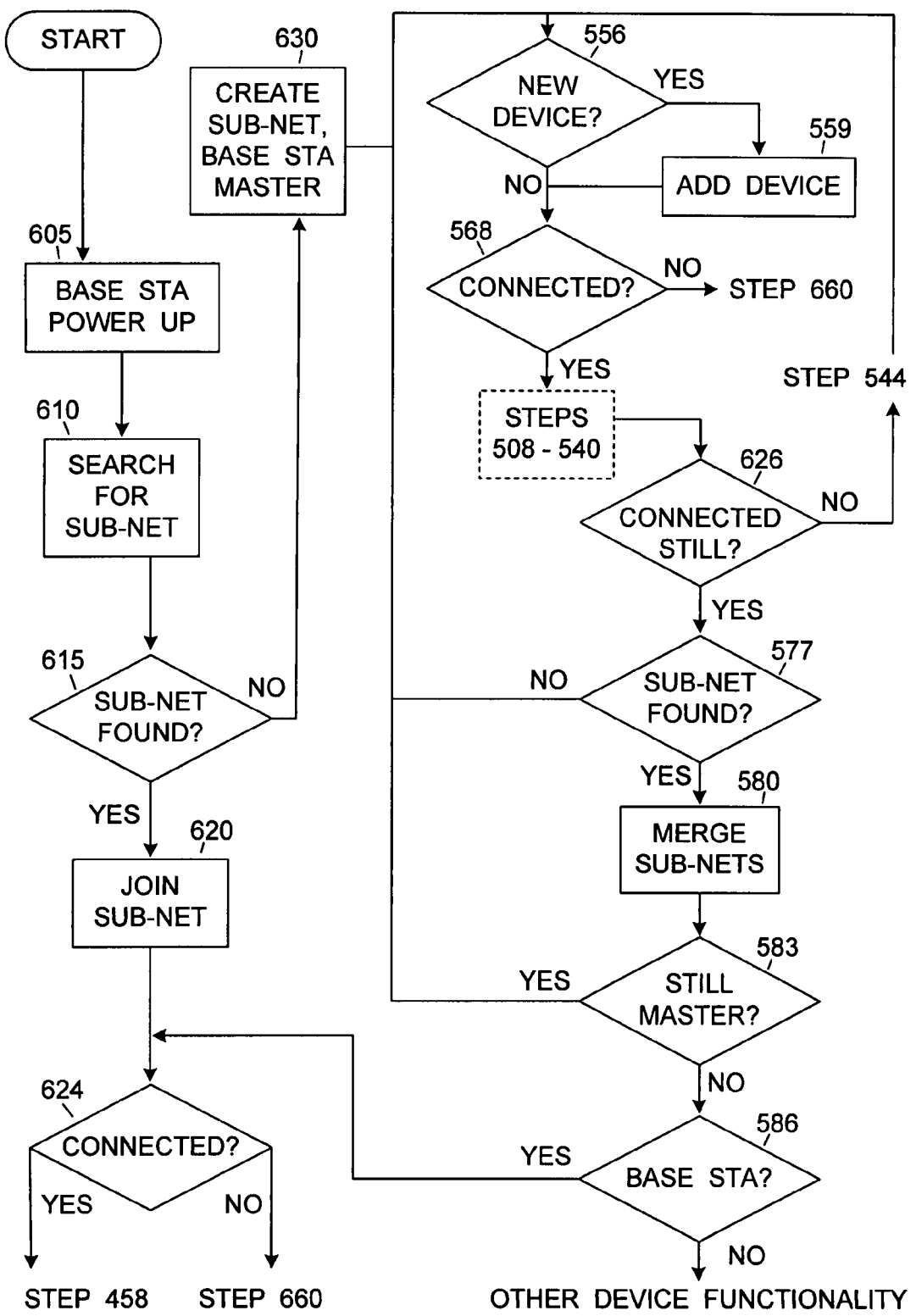
FIG. 28 is a simplified flowchart that depicts some of the steps corresponding to operation of a base station, the depicted steps including power-up and searching for or creating a sub-network, in accordance with an embodiment.
Figure 29:
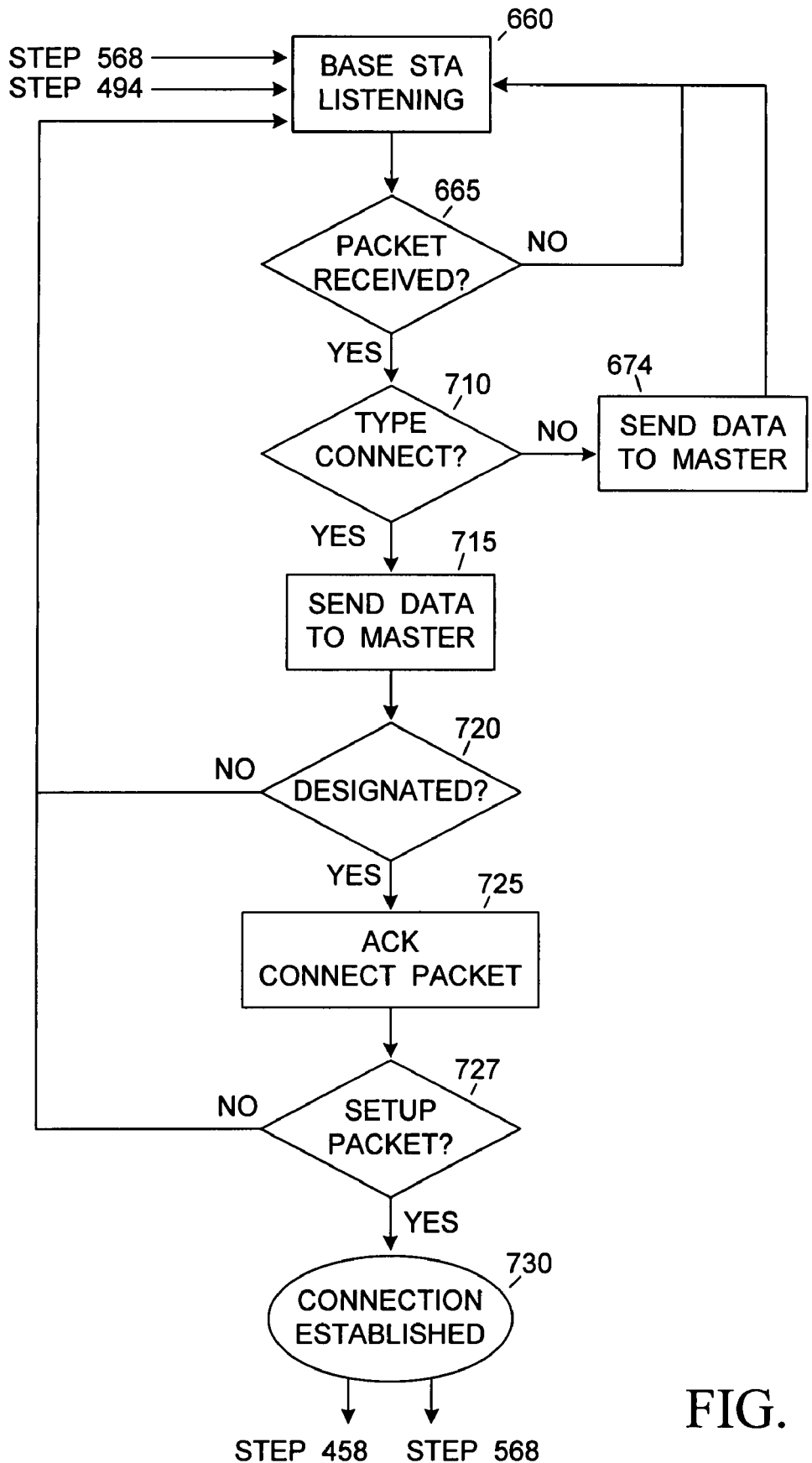
FIG. 29 is a simplified flowchart that depicts some of the steps corresponding to operation of a base station, the depicted steps including establishment of a connection with a remote unit, in accordance with an embodiment.

FIGS. 28-32 are flowcharts that depict steps corresponding to operation of base stations 20 and of sub-network masters, according to an embodiment. While the steps are depicted in a specific order within the flowcharts, it is understood that in many cases the order can vary from the order of steps in the depicted embodiment, as is known to those of skill in the art. FIG. 28 is a simplified flowchart that depicts some of the steps corresponding to operation of a base station 20, the depicted steps including power-up and searching for or creating a sub-network. When a base station 20 powers up (step 605), it searches (step 610) for one or more existing sub-network having the same shared base station identifier 24 as itself. If the base station 20 finds a sub-network (step 615), it joins the sub-network (step 620). Depending upon whether the sub-network is connected to a remote unit 30 (step 624), the base station 20 proceeds to step 458 (FIG. 30) or step 660 (FIG. 29). If the base station 20 does not find a sub-network having the same shared base station identifier 24, it creates a new sub-network (step 630) with itself as master for the sub-network. The master checks whether another device 28 such as a base station 20 wants to join the sub-network (step 556). If a device 28 requesting to join is found, the master adds the device 28 to the sub-network (step 559). If the new device 28 is a base station 20, it is added to the list of base stations 20 that are eligible to be the designated one for a remote unit 30.

Note that a sub-network master may be a device 28 that is not a base station 20. Thus, creation of a new sub-network, with a device 28 as master, is an alternative to step 30; this alternative is not depicted within FIG. 28. It is understood that steps 556 to 586 of FIG. 28 pertain to any sub-network master, which may be some other device 28 that is not a base station 20.

Figure 31:
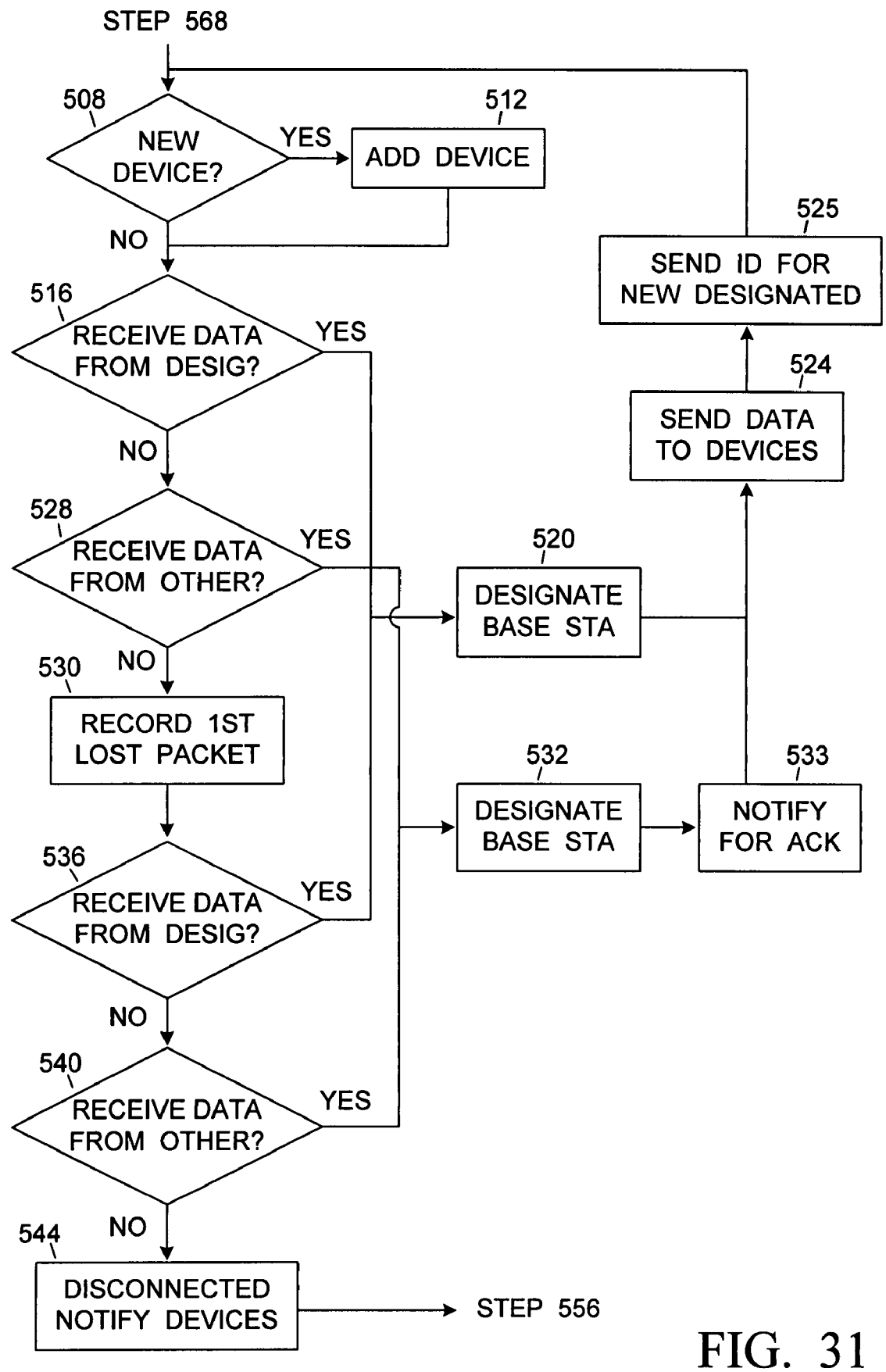
FIG. 31 is a simplified flowchart that depicts some of the steps corresponding to operation of a master, which may be a base station, in a connected sub-network, the depicted steps including steps pertaining to communication with a remote unit, in accordance with an embodiment.

A new sub-network is not yet connected to a remote unit 30. Connection of a base station 20 to a remote unit 30 is described in FIG. 29, beginning with step 660. The master in FIG. 28 continues to check (step 568) whether a connection to a remote unit 30 has been established by any base station 20 within the sub-network. After a connection is established (state 730 in FIG. 29), the master proceeds to steps 508-540 (FIG. 31). The master continues to check (step 626) whether the sub-network is still connected to the remote unit 30. If the connection has ended, the master proceeds to step 544 (FIG. 31). If a connection still exists, the master checks for other sub-networks within range (step 577) which use the same shared base station identifier 24. If such a sub-network is found, the two sub-networks merge (step 580). Following the merging of the sub-networks, each of which previously had its own master, only one of the former masters becomes master of the merged sub-network (step 583). One of the former masters continues to operate as a master (step 556). Depending whether the other former master is a base station 20 (step 586), it either proceeds to step 624, if it is a base station 20, or it performs other functionality appropriate for a device 28 that is not a base station 20. Note that merger of sub-networks can also occur when neither sub-network is currently connected to a remote unit 30 (not depicted). For example, step 577 could precede step 556 or step 568.

The new master of the merged sub-network is determined as follows. If one of the previous sub-networks has a designated base station 20 that is in communication with a remote unit 30, the master for that previous sub-network becomes master of the merged sub-network. If neither of the previous sub-networks is connected to a remote unit 30, then the master for the previous sub-network with the greatest number of member devices 28 becomes the new master. If the previous sub-networks have equal numbers of members, then the master with the lowest numerical device identifier becomes the new master. The former master notifies other devices 28 within its previous sub-network of the change in sub-network master.

Figure 30:
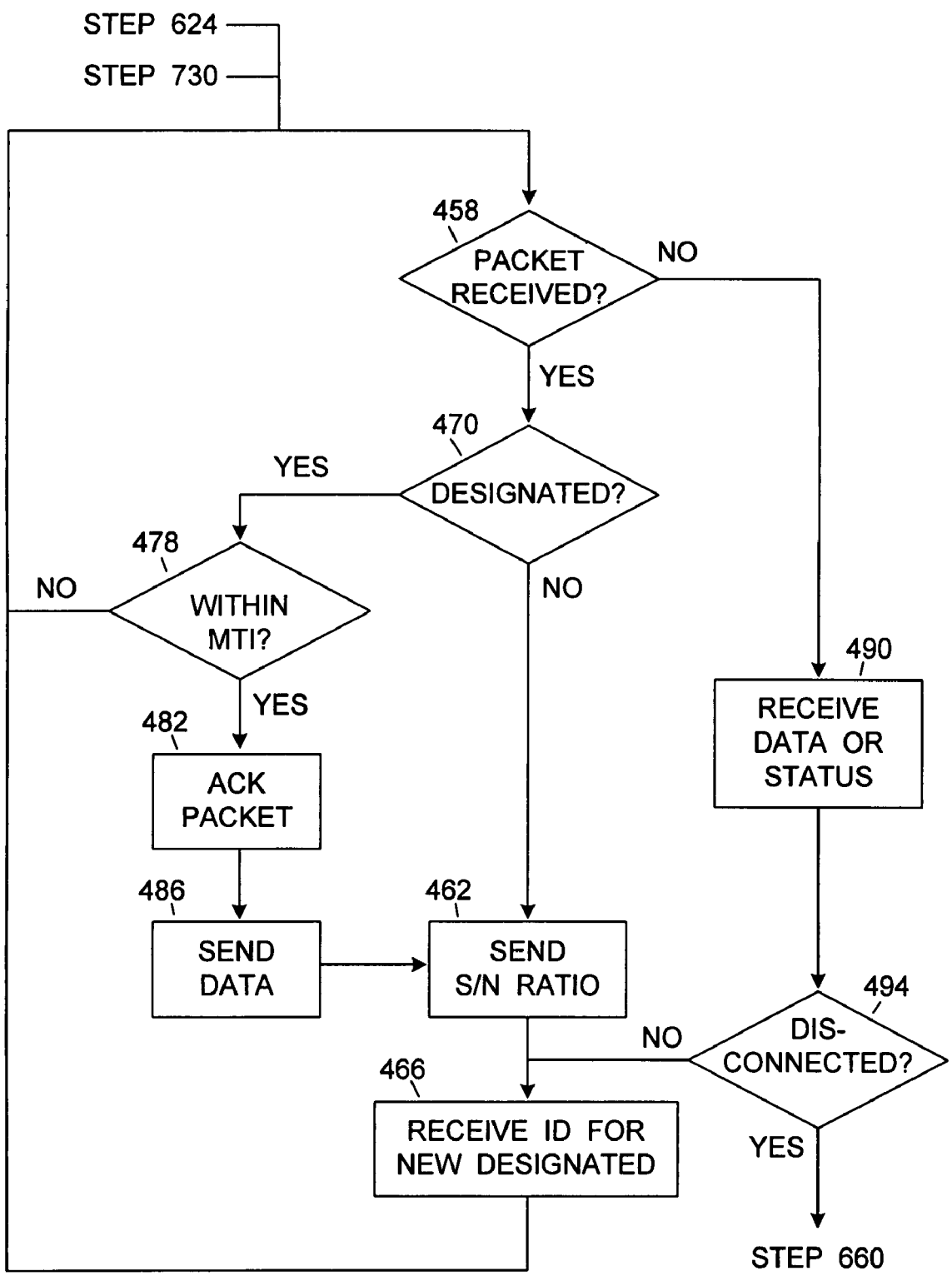
FIG. 30 is a simplified flowchart that depicts some of the steps corresponding to operation of a base station, the depicted steps pertaining to communication with a remote unit, in accordance with an embodiment.

FIG. 29 is a simplified flowchart that depicts some of the steps corresponding to operation of a base station 20, the depicted steps including establishment of a connection with a remote unit 30. A base station 20 may reach step 660 of FIG. 29 from step 568 (FIG. 28) or from step 494 (FIG. 30). A base station 20, which may be connected or disconnected, listens (step 660) for messages 12a sent using packets by a remote unit 30. Depending upon whether a packet is received (step 665), base station 20 either continues to listen (step 660) or checks the packet type (step 710). If the packet is not a connect packet, base station 20 forwards the data from the packet and the signal-to-noise ratio for the packet to the sub-network master (step 674), and then continues to listen for packets (step 660). If the packet is a connect packet, base station 20 sends data to the sub-network master (step 715), the sent data including the transmission channel chosen by the remote unit 30 and the signal-to-noise ratio for the packet.

The sub-network master determines which base station 20 is the current designated base station 20, as described in connection with FIGS. 10A and 10B. If a base station 20 is not the current designated one (step 720), it returns to listening for packets (step 660). If the base station 20 is the current designated one (step 720), then it acknowledges the connect packet (step 725). Establishment of the connection may entail a "three step handshake" protocol that includes the initial connect packet sent by remote unit 30, the acknowledgement sent by the designated base station 20, and a setup packet sent by remote unit 30. If the designated base station 20 does not receive the expected setup packet (step 727), base station 20 returns to listening for packets (step 660). If base station 20 does receive the expected setup packet (step 727), the connection is established (state 730). The sub-network master propagates the transmission channel chosen by the remote unit 30 (see discussion of step 715) to all base stations 20 within the sub-network. Following establishment of the connection, base station 20 proceeds to step 458 (FIG. 30) or, if base station 20 is the sub-network master, it proceeds to step 568 (FIG. 28). The setup packet comprises shared base station identifier 24 and remote unit identifier 32, and may also include status information such as the battery charge status or impedance monitoring information (discussed in connection with FIG. 21).

During establishment of a connection with a remote unit 30 and designation of a designated base station 20 for a sub-network, it is possible that another sub-network is simultaneously establishing connection with the same remote unit 30. It may be advantageous to avoid the designation of two separate designated base stations 20 for a single remote unit 30, each designated base station 20 being a member of a separate sub-network within a group or network. When a remote unit 30 transmits a connect packet to try to initiate a connection, base stations 20 within separate sub-networks may receive the connect packet. It is likely, however, that individual base stations 20 from separate sub-networks will acknowledge the connect packet at slightly different times. Thus, in one embodiment, the base station 20 that sends the earliest acknowledgement is the one that continues with the "three step handshake". The base station 20 that sends the later acknowledgment ceases to participate in the "three step handshake". The acknowledgement packet sent in response to the connect packet comprises three elements: packet type ("ACK"), shared base station identifier 24 that identifies the group or network, and an identifier (eg a random number) that identifies the sub-network.

FIG. 30 is a simplified flowchart that depicts some of the steps corresponding to operation of a base station 20, the depicted steps pertaining to communication with a remote unit 30. As described previously, a base station 20 normally listens (step 660 of FIG. 29) for messages 12a sent using packets by a remote unit 30. If no packet is received by a particular base station 20 (step 458), the base station 20 may receive data or status information from the sub-network master (step 490). For example, the master may forward data received from remote unit 30 by another base station 20 or the master may send the identifier for the current designated base station 20. If a base station 20 receives a packet (step 458), and if the base station 20 is not the designated one (step 470), then the base station 20 sends the signal-to-noise ratio for the received packet to the sub-network master (step 462).

If a base station 20 receives a packet (step 458), and if the base station 20 is the designated one (step 470), then the next steps depend upon whether the packet was received within the MTI (step 478). It the packet was received after the end of the MTI (step 478), the designated base station 20 returns to listening for packets. If the packet was received within the MTI (step 478) and before the sub-network master forwards data or status information (step 490), which may include notification of a new designated one, then the current designated base station 20 sends an acknowledgement to the remote unit 30 (step 482). The designated base station 20 also sends to the sub-network master the data received in the packet (step 486) and the signal-to-noise ratio for the received packet (step 462); the data and signal-to-noise ratio may be combined for sending to the sub-network master. Each base station 20, whether or not it was the previously designated one, receives from the sub-network master the identifier for the current designated one (step 466), and then returns to listening for packets. If no packet was received within the MTI, and if the sub-network becomes disconnected (step 494), then the base station proceeds to step 660 (FIG. 29).

FIG. 31 is a simplified flowchart that depicts some of the steps corresponding to operation of a master, which may be a base station 20, in a connected sub-network, the depicted steps including steps pertaining to communication with a remote unit 30. The sub-network master checks whether any device 28 requests to join the sub-network (step 508) and adds any such device 28 to the sub-network (step 512). The master then waits for communications from base stations 20. If the master receives signal-to-noise ratio data within the MTI from the designated base station 20 (step 516), and possibly from other base stations 20 as well, then the master designates the next designated one (step 520) based upon the signal-to-noise ratio sent by each base station 20. If the master receives signal-to-noise ratio data within the MTI from other base stations 20 but not from the designated one (step 528), then the master designates the next designated one (step 532) based upon the signal-to-noise ratio sent by each base station 20. The master also notifies the next (now current) designated one of its designated status so that the designated one will acknowledge the received packet (step 533), and the master requests from the current designated one the packet data sent by the remote unit 30. The master forwards the packet data and the identifier for the current designated one (steps 524 and 525) to base stations 20 that did not send a signal-to-noise ratio at step 516 or step 528. Failure to receive data from the previous designated one at step 516 might occur because the previous designated one did not receive the packet from the remote unit 30 within the MTI or because the previous designated one is no longer in communication with the sub-network (e.g. because of interference).

If the master does not receive signal-to-noise ratio data from any base station 20 within the MTI, the master records a first lost packet (step 530) and continues to wait. The remote unit 30 did not receive any acknowledgement recently, so the next packet sent by the remote unit 30 should be a re-transmission of the previous (lost) packet. If the original packet is received with a delay and a re-transmitted packet is also received, then one of the packets is discarded as a duplicate, as is known in the art. If the master receives signal-to-noise ratio data within the MTI from the designated one (step 536) or from another base station 20 (step 540), the master determines the designated one as before (step 520 or step 532). If the master does not receive signal-to-noise ratio data within the MTI from the designated one (step 536) or from another base station 20 (step 540), the master sets the sub-network status to disconnected and notifies all devices 28 within the sub-network (step 544). The master returns to step 556 (FIG. 28).

If the master does not receive notice of a re-transmission within the MTI, this may be because the initial packet was in fact acknowledged by the previous designated one (step 482 of FIG. 30) which may then have dropped out of the sub-network temporarily (e.g. because of interference) before sending the signal-to-noise ratio to the master (step 462 of FIG. 30). The master attempts to communicate with the previous designated one to determine whether the initial packet was acknowledged and whether the previous designated one is still in communication with the sub-network.

Figure 32:
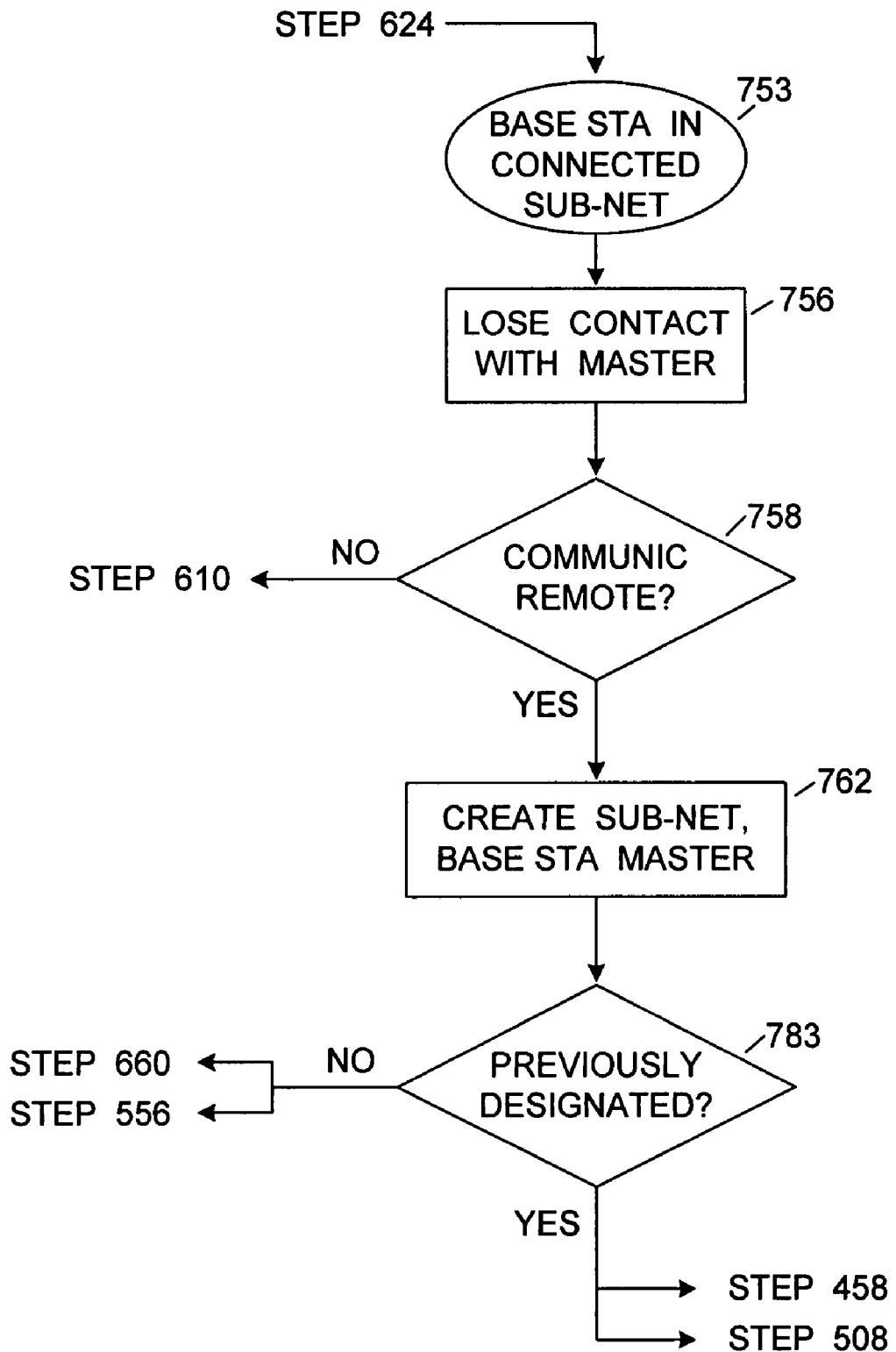
FIG. 32 is a simplified flowchart that depicts some of the steps corresponding to operation of a base station, the depicted steps pertaining to loss of contact with a sub-network master, in accordance with an embodiment.

FIG. 32 is a simplified flowchart that depicts some of the steps corresponding to operation of a base station 20, the depicted steps pertaining to loss of contact with a sub-network master. A base station 20 that is a member of a connected sub-network (state 753) may lose contact with the sub-network master (step 756). If the base station 20 is no longer in communication with the remote unit 30 (step 758), then the base station 20 searches for a sub-network to join (step 610 in FIG. 28). If the base station 20 is still in communication with the remote unit 30 (step 758), the base station 20 creates a new sub-network with itself as master (step 762). If the base station 20 was not the designated one in the previous sub-network (step 783), the base station proceeds to step 660 (FIG. 29) or step 556 (FIG. 28). If the base station 20 was the designated one in the previous sub-network (step 783), the base station proceeds to step 458 (FIG. 30) and step 508 (FIG. 31).

If there is no direct path between a sub-network master and a base station 20 within the sub-network, then another device 28 may serve as a relay. This complicates the network topology, but these complications are already handled by several network protocols such as TCP/IP, and relays are required as a sub-network grows beyond the range of the communications link used.

The effective data bandwidth of the network must be high enough to handle the required traffic, also taking into account that net throughput may be lowered by having multiple hops between a base station 20 and the sub-network master. If a network serves multiple remote units 30, this will further increase the load on the network in direct proportion to the number of remote units 30. The combination of network bandwidth, multiple-hop constraints and multiple remote unit 30 loading determines the sub-Network capacity.

The data from the remote unit 30 are processed by the base stations 20 according to the application requirements. This is beyond the scope of the present description, but must be taken into account when determining the processing and/or communications load on the base stations 20.

Embodiments may be realized in hardware, software, or a combination of hardware and software. An embodiment may be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. One or more embodiment may also correspond to a set of processor-executable instructions stored on a processor-readable medium Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Although we have described in detail various embodiments, other embodiments and modifications will be apparent to those of skill in the art in light of this text and accompanying drawings. The following claims are intended to include all such embodiments, modifications and equivalents.

What is claimed is:

1. A low-power remote unit that is adapted to be powered from a battery, the low-power remote unit comprising:
    means for transmitting a first message via a wireless medium to a plurality of base stations and for receiving a second message via the wireless medium from a designated one of the plurality of base stations on behalf of the plurality of base stations;
    wherein the plurality of base stations use a shared base station identifier for communication that is specific for the low-power remote unit.

2. The low-power remote unit of claim 1, further comprising a data source, wherein the data source sends data to the means for transmitting and receiving.

3. The low-power remote unit of claim 2, wherein the data source comprises a data acquisition unit and a sensor that sends a signal to the data acquisition unit.

4. The low-power remote unit of claim 1, wherein the first message comprises information pertaining to a detection of a substance or a condition.

5. The low-power remote unit of claim 1, wherein the first message comprises a remote unit identifier or the shared base station identifier; and
    wherein during a first time period the first message is received by at least one of the plurality of base stations; and
    wherein during a second time period the low-power remote unit transmits via the wireless medium a third message, the third message comprising the remote unit identifier or the shared base station identifier, and the third message is received by none of the plurality of base stations and an alert is generated.

6. The low-power remote unit of claim 1, wherein the first message comprises the shared base station identifier; and
    wherein the first message is received by at least one of the plurality of base stations and a location for the low-power remote unit is determined.

7. The low-power remote unit of claim 6, wherein the first message received by the at least one of the plurality of base stations has a signal-to-noise ratio and the location is determined at least partially based upon the signal-to-noise ratio.

8. A system comprising:
    a specific low-power remote unit that is adapted to be powered from a battery; and
    a plurality of base stations that are capable of communicating with one another;
    wherein a designated one of the plurality of base stations transmits a message via a wireless medium to the specific low-power remote unit on behalf of the plurality of base stations, and wherein the plurality of base stations use a shared base station identifier for communication with the specific low-power remote unit.

9. The system of claim 8, wherein the designated one transmits the message during a first time period; and
    wherein during a second time period a second designated one transmits a second message via the wireless medium to the specific low-power remote unit on behalf of the plurality of base stations, the second designated one being one of the plurality of base stations.

10. The system of claim 9, wherein a first identity for the designated one differs from a second identity for the second designated one.

11. The system of claim 9, wherein during the first time period the specific low-power remote unit transmits a third message via the wireless medium to the plurality of base stations and at least one of the plurality of base stations receives the third message; and
    wherein the third message received by the at least one of the plurality of base stations has a signal-to-noise ratio and designation of the second designated one is at least partially based upon the signal-to-noise ratio.

12. The system of claim 8, wherein the specific low-power remote unit transmits a fourth message via the wireless medium to the plurality of base stations.

13. The system of claim 12, wherein the fourth message comprises information pertaining to a detection of a substance or a condition.

14. The system of claim 8, wherein a third designated one transmits a fifth message via the wireless medium to a second specific low-power remote unit on behalf of the plurality of base stations, the third designated one being one of the plurality of base stations.

15. The system of claim 14, wherein a first identity for the designated one differs from a third identity for the third designated one.

16. A monitor comprising:
    a sensor module comprising a sensor; and
    an electronics module comprising:
        means for transmitting a first message via a wireless medium to a plurality of base stations and for receiving a second message via the wireless medium from a designated one of the plurality of base stations on behalf of the plurality of base stations,
        wherein the plurality of base stations use a shared base station identifier for communication that is specific for the monitor; and a data acquisition unit, wherein the data acquisition unit sends data to the means for transmitting and receiving;

wherein the electronics module is attached to the sensor module and the sensor sends a signal to the data acquisition unit.

17. The monitor of claim 16, wherein the sensor comprises two electrodes.

18. The monitor of claim 16, wherein the sensor comprises at least two electrodes.

19. The monitor of claim 16, wherein the electronics module that is attached to the sensor module is removably attached.

20. The monitor of claim 19, wherein the sensor module further comprises a flexible portion and a rigid portion and the electronics module is attached to the rigid portion.

21. The monitor of claim 16, wherein the first message comprises information pertaining to a physiological value.

22. The monitor of claim 16, wherein the first message comprises information pertaining to a detection of a substance or a condition.

23. A system comprising:
a specific monitor comprising:
   a sensor module comprising a sensor; and
   an electronics module that is attached to the sensor module; and
a plurality of base stations that are capable of communicating with one another;
wherein a designated one of the plurality of base stations transmits a message via a wireless medium to the specific monitor on behalf of the plurality of base stations, and wherein the plurality of base stations use a shared base station identifier for communication with the specific monitor.

24. The system of claim 23, wherein the designated one transmits the message during a first time period; and
wherein during a second time period a second designated one transmits a second message via the wireless medium to the specific monitor on behalf of the plurality of base stations, the second designated one being one of the plurality of base stations.

25. The system of claim 24, wherein a first identity for the designated one differs from a second identity for the second designated one.

26. The system of claim 24, wherein during the first time period the specific monitor transmits a third message via the wireless medium to the plurality of base stations and at least one of the plurality of base stations receives the third message; and
wherein the third message received by the at least one of the plurality of base stations has a signal-to-noise ratio and designation of the second designated one is at least partially based upon the signal-to-noise ratio.

27. The system of claim 23, wherein the specific monitor transmits a fourth message via the wireless medium to the plurality of base stations.

28. The system of claim 27, wherein the fourth message comprises information pertaining to a physiological value.

29. The system of claim 27, wherein the fourth message comprises information pertaining to a detection of a substance or a condition.

30. The system of claim 23, wherein a third designated one transmits a fifth message via the wireless medium to a second specific monitor on behalf of the plurality of base stations, the third designated one being one of the plurality of base stations.

31. The system of claim 30, wherein a first identity for the designated one differs from a third identity for the third designated one.

32. A message comprising:
a shared sender address that is shared by a plurality of base stations, wherein the shared sender address is used by a designated one of the plurality of base stations when transmitting the message via a wireless medium on behalf of the plurality of base stations from the designated one to a specific low-power remote unit that is adapted to be powered from a battery.

* * * * *